(12) United States Patent
Minamiyama et al.

(10) Patent No.: US 10,251,202 B2
(45) Date of Patent: Apr. 2, 2019

(54) WIRELESS COMMUNICATION SYSTEM

(71) Applicant: Panasonic Intellectual Property Management Co., Ltd., Osaka (JP)

(72) Inventors: Masanori Minamiyama, Osaka (JP); Yasuhiro Kawakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 143 days.

(21) Appl. No.: 15/034,357

(22) PCT Filed: Nov. 19, 2014

(86) PCT No.: PCT/JP2014/005806
§ 371 (c)(1),
(2) Date: May 4, 2016

(87) PCT Pub. No.: WO2015/079656
PCT Pub. Date: Jun. 4, 2015

(65) Prior Publication Data
US 2016/0295453 A1    Oct. 6, 2016

(30) Foreign Application Priority Data

Nov. 26, 2013  (JP) .................................. 2013-244208
Aug. 5, 2014   (JP) .................................. 2014-159771

(51) Int. Cl.
*H04W 74/08*    (2009.01)
*H04W 40/02*    (2009.01)
(Continued)

(52) U.S. Cl.
CPC ........ *H04W 74/085* (2013.01); *H04B 1/7143* (2013.01); *H04B 3/36* (2013.01);
(Continued)

(58) Field of Classification Search
None
See application file for complete search history.

(56) References Cited

U.S. PATENT DOCUMENTS 7,184,421 B1 *    2/2007  Liu ....................... H04L 12/189
                                                                370/254
2004/0264466 A1 * 12/2004  Huang .................. H04L 45/123
                                                                370/392

(Continued)

FOREIGN PATENT DOCUMENTS

EP        1952588 B1      5/2011
JP       2005-117244 A    4/2005
(Continued)

OTHER PUBLICATIONS

C. Perkins et al., Ad hoc On-Demand Distance Vector (AODV) Routing, RFC 3561 [online],Feb. 3, 2015,<URL:http://www.ietf.org/rfc/rfc3561.txt>, IETF, Jul. 2003, pp. 1-37.

(Continued)

*Primary Examiner* — Alex Skripnikov
(74) *Attorney, Agent, or Firm* — McDermott Will & Emery LLP

(57) ABSTRACT

A wireless communication system includes a first node as a source node having a wireless communication function, a second node as a destination node having a wireless communication function, and one or more third nodes configured to relay wireless communication between the first node and the second node. While a communication path through which data is sent from the first node to the second node is not established, the first node and the one or more third nodes send data in broadcast. After determining a destination in at least a part of the communication path from the first node to the second node, a node out of the first node and the (Continued)

one or more third nodes which has the determined destination sends data to the determined destination in unicast.

25 Claims, 18 Drawing Sheets

(51) Int. Cl.
    *H04W 40/12*     (2009.01)
    *H04W 40/28*     (2009.01)
    *H04L 1/00*     (2006.01)
    *H04W 52/02*     (2009.01)
    *H04B 1/7143*     (2011.01)
    *H04B 3/36*     (2006.01)
    *H04H 20/38*     (2008.01)
    *H04L 5/00*     (2006.01)
    *H04L 12/26*     (2006.01)
    *H04L 29/06*     (2006.01)
    *H04W 40/00*     (2009.01)
    *H04W 84/18*     (2009.01)
    *H04W 28/06*     (2009.01)

(52) U.S. Cl.
    CPC ............... *H04H 20/38* (2013.01); *H04L 1/00* (2013.01); *H04L 5/0055* (2013.01); *H04L 43/16* (2013.01); *H04L 69/22* (2013.01); *H04L 69/28* (2013.01); *H04W 40/005* (2013.01); *H04W 40/02* (2013.01); *H04W 40/12* (2013.01); *H04W 40/28* (2013.01); *H04W 52/0219* (2013.01); *H04W 28/06* (2013.01); *H04W 84/18* (2013.01); *Y02D 70/00* (2018.01); *Y02D 70/142* (2018.01); *Y02D 70/144* (2018.01); *Y02D 70/30* (2018.01); *Y02D 70/34* (2018.01)

(56) References Cited

U.S. PATENT DOCUMENTS

| | | | |
|---|---|---|---|
| 2005/0063312 A1 | 3/2005 | Liu | |
| 2006/0205424 A1 | 9/2006 | Dupcinov et al. | |
| 2007/0248065 A1* | 10/2007 | Banerjea | ................. H04L 45/26 370/338 |
| 2007/0263628 A1* | 11/2007 | Axelsson | ................ H04L 45/00 370/392 |
| 2008/0170550 A1 | 7/2008 | Liu et al. | |
| 2008/0316951 A1* | 12/2008 | Zeng | ....................... H04L 45/00 370/312 |
| 2008/0316954 A1 | 12/2008 | Zheng | |
| 2011/0170443 A1* | 7/2011 | Murias | ................... H04W 40/28 370/252 |
| 2014/0266773 A1* | 9/2014 | Aguilar | .................... H04Q 9/00 340/870.01 |

FOREIGN PATENT DOCUMENTS

| | | |
|---|---|---|
| JP | 2005-252856 A | 9/2005 |
| JP | 2006-505186 A | 2/2006 |
| JP | 2008-533809 A | 8/2008 |
| JP | 2008-547311 A | 12/2008 |
| JP | 2009-212865 A | 9/2009 |
| JP | 2011-151657 A | 8/2011 |
| JP | 2011-205396 A | 10/2011 |
| JP | 2011-239076 A | 11/2011 |
| JP | 2013-074355 A | 4/2013 |
| WO | 2004/040863 A1 | 5/2004 |
| WO | 2006/098723 A1 | 9/2006 |
| WO | 2007/001286 A1 | 1/2007 |
| WO | 2012/165938 A1 | 12/2012 |

OTHER PUBLICATIONS

International Search Report issued in Application No. PCT/JP2014/005806 dated Feb. 17, 2015, with English translation.
English Translation of Chinese Search Report dated Oct. 31, 2018 for the related Chinese Patent Application No. 201480061277.3.

* cited by examiner

| D1 | D2 | D3 | D4 | D5 |
|---|---|---|---|---|
| Preamble | SFD | Data Length | ACK | CRC |
| 4 [Byte] | 1 [Byte] | 1 [Byte] | 6 [Byte] | 2 [Byte] | ns
WIRELESS COMMUNICATION SYSTEM

RELATED APPLICATIONS

This application is the U.S. National Phase under 35 U.S.C. § 371 of International Application No. PCT/JP2014/005806, filed on Nov. 19, 2014, which in turn claims the benefit of Japanese Application No. 2013-244208, filed on Nov. 26, 2013, and Japanese Application No. 2014-159771, filed on Aug. 5, 2014, the disclosures of which are incorporated by reference herein.

TECHNICAL FIELD

The present invention relates to a wireless communication system, particularly to a wireless communication system in which relay station nodes relay data between a base station node and each of branch station nodes.

BACKGROUND ART

In a conventional network system, a base station node and plural branch station nodes perform multi-hop wireless communication (see, e.g. PTL 1).

In this network system, the branch station nodes are connected to respective measurement devices. In the case that the base station node requests data to a branch station node connected to a measurement device while a communication path to this node has not been established, the base station node sends a request packet requesting the data in broadcast without specifying a destination branch station node.

When a branch station node receiving the request packet from the base station node finds that a destination address of this packet does not agree with a device ID of the branch station node, the branch station node functions as a relay node, and sends the request packet to other branch station nodes in broadcast. Thus, branch station nodes receive and transfer the request packet in broadcast one after another, thereby allowing the request packet to be finally received by a destination branch station node connected to the measurement device. This destination branch station node generates an acknowledge packet in reply to the request packet from the base station node and sends this acknowledge packet in unicast to a specific node. A header of the acknowledge packet contains a device ID of the branch station node that generates the acknowledge packet and information about a communication path to the base station node. Thus, the branch station nodes receive and transfer the acknowledge packet in unicast one after another, thereby the acknowledge packet to be finally received by the base station node.

In this network system, however, it may take long time to establish the communication path.

Moreover, in a wireless communication system, data collision between nodes may degrade communication quality and increases data retransmission to increase power consumption.

CITATION LIST

Patent Literature

PTL 1: Japanese Patent Laid-Open Publication No. 2013-74355

SUMMARY

A wireless communication system includes a first node as a source node having a wireless communication function, a second node as a destination node having a wireless communication function, and one or more third nodes configured to relay wireless communication between the first node and the second node. While a communication path through which data is sent from the first node to the second node is not established, the first node and the one or more third nodes send data in broadcast. After determining a destination in at least a part of the communication path from the first node to the second node, a node out of the first node and the one or more third nodes which has the determined destination sends data to the determined destination in unicast.

This wireless communication system decreases possibility of data collision while establishing the communication path.

DETAIL DESCRIPTION OF PREFERRED EMBODIMENTS

Wireless communication systems according to exemplary embodiments will be described with reference to drawings. The following exemplary embodiments, however, are merely examples of the present invention and can be variously modified according to the design and other factors within the technical scope of the invention.

Exemplary Embodiment 1

Figure 1A:
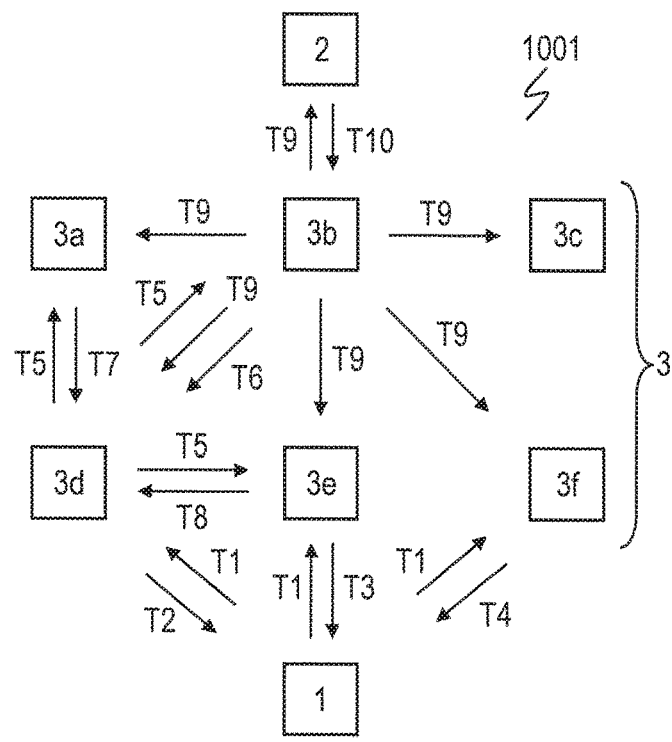
FIG. 1A is a schematic diagram of a wireless communication system according to Exemplary Embodiment 1 for illustrating a communication procedure.

FIG. 1A shows a schematic configuration of wireless communication system 1001 according to Exemplary Embodiment 1. Wireless communication system 1001 includes branch station 1 which is a source node sending data, base station 2 which is a destination node of data, and one or more relay stations 3 which are one or more nodes. The system according to Embodiment 1 includes six relay stations 3. One or more relay stations 3 may be single relay station 3. One or more relay stations 3 include relay stations 3a, 3b, 3c, 3d, 3e, and 3f. In the following description, the individual relay stations may be specified as relay stations 3a, 3b, 3c, 3d, 3e, and 3f, or may be collectively referred to as relay stations 3. The wireless communication system according to the embodiment includes six relay stations 3, but may include any number of relay stations required for signal relay. Alternatively, plural branch stations 1 as data source nodes may exist, and base station 2 may collect data from branch stations 1 via relay station 3.

Each of branch station 1, base station 2, and relay station 3 includes a wireless communication unit, such as a specified low power radio module or a wireless communication unit compliant with the IEEE 802.15.1 or 802.15.4 standard, which does not require a radio license. Branch station 1 and base station 2 directly communicate with each other in wireless when both the stations are within communication areas thereof. Meanwhile, when the stations cannot directly communicate with each other, branch station 1 and base station 2 perform wireless communication via relay station 3. In order to relay wireless communication between branch station 1 and base station 2, relay stations 3 adjacent to each other are located within communication areas thereof, thereby establishing a relay network.

Configurations of branch station 1, base station 2, and relay station 3 will be described below.

Figure 2A:
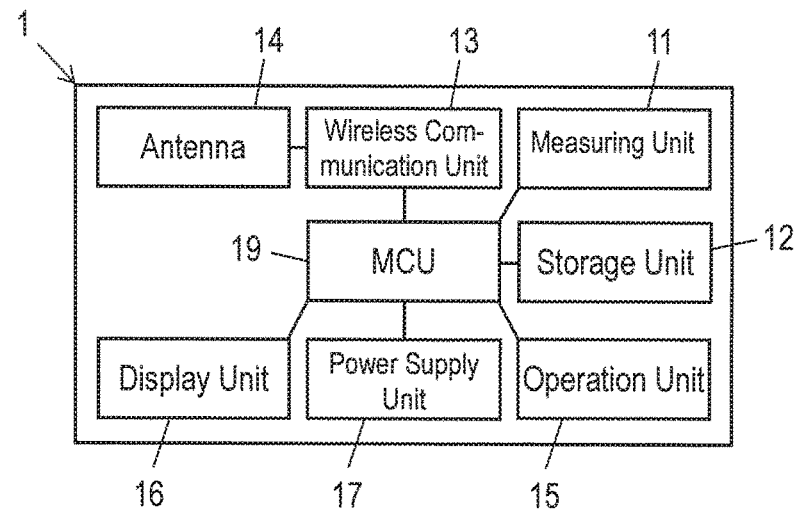
FIG. 2A is a block diagram of a branch station in the wireless communication system according to Embodiment 1.

FIG. 2A is a block diagram of branch station 1. Branch station 1 includes micro control unit (MCU) 19, measurement unit 11, storage unit 12, wireless communication unit 13, antenna 14, operation unit 15, display unit 16, and power supply unit 17. Branch station 1 sends, in wireless, base station 2 data which is measured at a predetermined timing by measurement unit 11.

MCU 19 entirely controls branch station 1.

Measurement unit 11 which measures a temperature includes a thermistor having a resistance changing according to an ambient temperature. Measurement unit 11 measures the resistance of the thermistor to measure the ambient temperature. Measurement unit 11 can measure any physical quantity, such as ambient humidity or ambient illuminance, other than the temperature according to the purpose of use.

Storage unit 12 is implemented by e.g. an electrically erasable and programmable read-only memory (EEPROM) or an electrically rewritable nonvolatile memory, such as a flash memory. Storage unit 12 stores, e.g. identification information (branch station ID) assigned to branch station 1, measured data from measurement unit 11, and communication path information. MCU 19 Reads and writes data in storage unit 12.

Wireless communication unit 13 is composed of wireless modules compliant with a standard of, for example, the specified low power radio communication, and sends and receives wireless signals through antenna 14.

Operation unit 15 is used to set, e.g. upper and lower limits of the measurement range of measurement unit 11, a measurement interval, and a transmission interval of measured data.

Display unit 16 is implemented by, e.g. one or more light emitting diodes turned on and off under control from MCU 19.

Power supply unit 17 is energized by, for example, a battery and supplies power to an internal circuit of branch station 1 for its operation.

Figure 2B:
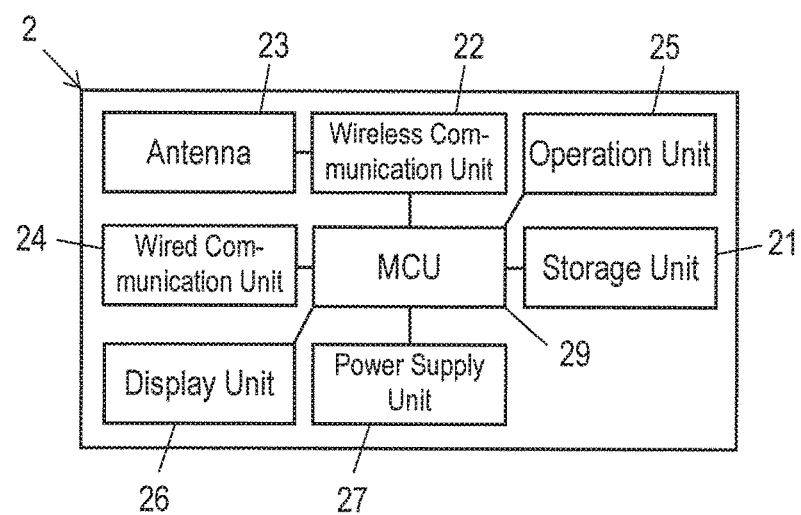
FIG. 2B is a block diagram of a base station in the wireless communication system according to Embodiment 1.

FIG. 2B is a block diagram of base station 2. Base station 2 includes MCU 29, storage unit 21, wireless communication unit 22, antenna 23, wired communication unit 24, operation unit 25, display unit 26, and power supply unit 27.

MCU 29 entirely controls base station 2.

Storage unit 21 is implemented by, e.g. an EEPROM or an electrically rewritable nonvolatile memory such as a flash memory. Storage unit 21 stores, e.g. identification information assigned to base station 2, measured data from branch station 1, and communication path information. MCU 29 reads and writes the data in storage unit 21.

Wireless communication unit 22 is composed of wireless modules compliant with a standard of, for example, the specified low power radio communication, and sends and receives wireless signals through antenna 23.

Wired communication unit 24 is connected to, for example, a server through a communication line, and sends data collected from branch station 1 to the server via wire.

Operation unit 25 is used, for example, to set the operation of base station 2.

Display unit 26 is implemented by, e.g. one or more light emitting diodes turned on and off under control from MCU 29.

Power supply unit 27 is energized by, for example, a commercial power supply, and supplies power to an internal circuit of base station 2 for its operation.

Figure 2C:
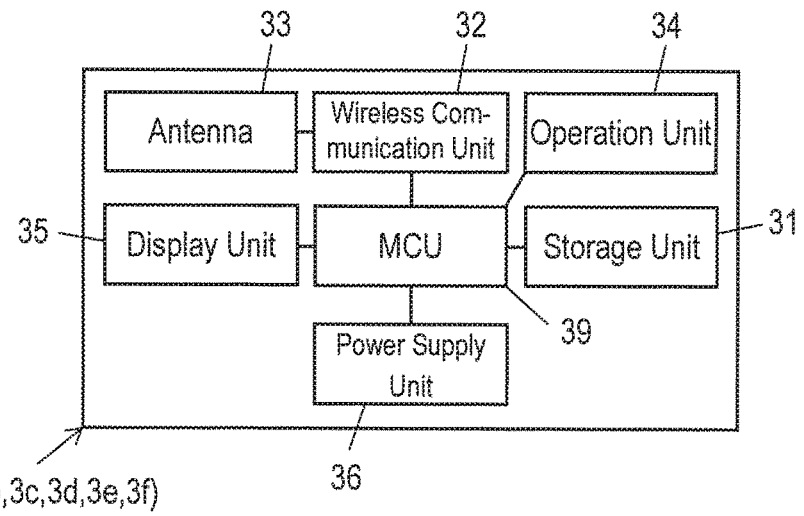
FIG. 2C is a block diagram of a relay station in the wireless communication system according to Embodiment 1.

FIG. 2C is a block diagram of relay station 3. Relay station 3 includes MCU 39, storage unit 31, wireless communication unit 32, antenna 33, operation unit 34, display unit 35, and power supply unit 36.

MCU 39 entirely controls relay station 3.

Storage unit 31 is implemented by e.g. an EEPROM or an electrically rewritable nonvolatile memory, such as a flash memory. Storage unit 31 stores, e.g. identification information assigned to relay station 3, data received and sent by wireless communication unit 32, and communication path information. MCU 39 reads and writes the data in storage unit 31.

Wireless communication unit 32 is composed of wireless modules compliant with a standard of, for example, the specified low power radio communication, and sends and receives wireless signals through antenna 33.

Operation unit 34 is used, for example, to set the operation of relay station 3.

Display unit 35 is implemented by, e.g. one or more light emitting diodes turned on and off under control from MCU 39.

Power supply unit 36 is energized by for example, a battery and supplies power to an internal circuit of relay station 3 for its operation. Since being energized by a battery, relay station 3 can be located anywhere. Alternatively, power supply unit 36 may be supplied power from a commercial power supply and supply power to the internal circuit of relay station 3 for its operation.

Processes for sending measured data from branch station I to base station 2 when a communication path is not established between the stations in wireless communication system 1001 according to Embodiment 1 will be described below. FIGS. 1A to 1D are schematic diagrams of wireless communication system 1001 for illustrating communication procedures.

A communication procedure in which branch station 1 sends measured data for the first time while a communication path is not established between branch station 1 and base station 2 will be described below with reference to FIG. 1A.

MCU 19 of branch station 1 starts up from a sleep mode at a predetermined sampling interval ranging from, for example, a few seconds to a few minutes, and allows measurement unit 11 to measure a temperature. MCU 19 of branch station 1 stores data measured by measurement unit 11, a sequence number assigned to data to be sent, and a branch station ID. MCU 19 of branch station 1 generates the data to be sent with a broadcast destination address, and allows wireless communication unit 13 to send the data in broadcast (process T1 shown in FIG. 1A). In short, branch station 1 sends the data in broadcast (process T1 shown in FIG. 1A).

In the example shown in FIG. IA, three relay stations 3d, 3e, and 3f exist in a communication area of branch station 1 in which branch station 1 can directly communicate. The data from branch station 1 is received by relay stations 3d, 3e, and 3f. When wireless communication unit 32 of relay station 3d receives the data from branch station 1, MCU 39 of relay station 3d allows wireless communication unit 32 to send an acknowledgement (hereinafter "ACK") in reply to branch station 1 as a source node (process T2 shown in FIG. 1A). Relay stations 3e and 3f also send an ACK to branch station 1 (processes T3 and T4 shown in FIG. 1A). In short, Then receiving the data from branch station 1, relay stations 3d, 3e, and 3f send an ACK to branch station 1 as the source node (processes T2, T3, and T4 shown in FIG. 1A). Thus, when a predetermined time elapses from receiving one ACK after sending the data, branch station 1 is switched to the sleep mode as to reduce power consumption.

A process in which that relay station 3d relays the data received from branch station 1 will be described below. MCU 39 of relay station 3d extracts the measured data, the sequence number, and the branch station ID from the data sent from branch station 1. MCU 39 of relay station 3d then generates data containing the measured data, the sequence number, and the branch station ID and having a broadcast address as a destination address. MCU 39 of relay station 3d then causes wireless communication unit 32 to send the generated data in broadcast (process T5 shown in FIG. 1A). In short, relay station 3d sends the generated data in broadcast (process T5 shown in FIG. 1A). In the example shown in FIG. 1A, three relay stations 3a, 3b, and 3e and branch station 1 exist in the communication area of relay station 3d relay stations 3a, 3b, and 3e, and branch station 1 in which can relay station 3d can communicate. The data sent in broadcast from relay station 3d is received, by relay stations 3a, 3b, and 3e, but not received, by branch station 1 since branch station 1 is in the sleep mode from the time at which branch station 1 receives the ACK after the sending of the data. Relay stations 3e and 3f, similarly to relay station 3d, extracts the measured data, the sequence number, and the branch station ID from the data sent from branch station 1. Relay stations 3e and 3f then generate data containing the measured data, the sequence number, and the branch station ID and having a broadcast address as a destination address. Relay stations 3e and 3f then send the data in broadcast.

When wireless communication unit 32 of relay station 3b receives the data from relay station 3d, MCU 39 of relay station 3b sends an ACK to relay station 3d as the source node (process T6 shown in FIG. 1A). In short, when receiving the data from relay station 3d, relay station 3b sends an ACK to relay station 3d as the source node (process T6 shown in FIG. 1A). Relay stations 3a and 3e, similarly to relay station 3b, send an ACK to relay station 3d (processes T7 and T8 shown in FIG. 1A).

A process in which relay station 3b relays the data received from relay station 3d will be described below. MCU 39 of relay station 3b generates data containing the measured data, the sequence number, and the branch station ID extracted from the data received from relay station 3d and having the broadcast address as the destination address. MCU 39 of relay station 3b then allows wireless communication unit 32 to send the data in broadcast (process T9 shown in FIG. 1A). In short, relay station 3b sends the data in broadcast (process T9 in FIG. 1A). In the example shown in FIG. 1A, base station 2 and relay stations 3a and 3c to 3f exist in a communication area of relay station 3b in which relay station 3b can communicate. The data sent in broadcast from relay station 3b is received by base station 2 and relay stations 3a and 3c to 3f. Relay stations 3a and 3e, similarly to relay station 3b, generate the data containing the measured data, the sequence number, and the branch station ID extracted from the data received from relay station 3d and having the broadcast address as a destination address. Relay stations 3a and 3e then send the data in broadcast.

Base station 2 and relay stations 3a and 3c-3f send an ACK when receiving the data from relay station 3b. A reply time elapsing until base station 2 sends an ACK after receiving data is shorter than a reply time elapsing until relay stations 3*a* and 3*c* to 3*f* send an ACK after receiving data. Therefore, the ACK from base station 2 is first received by relay station 3*b*.

When wireless communication unit 22 of base station 2 receives the data from relay station 3*b*, MCU 29 of base station 2 extracts the measured data, the sequence number, and the branch station ID from the received data, and determines that base station 2 receives new measured data from branch station 1. MCU 29 of base station 2 then sends to relay station 3*b* as the source node an ACK with final destination information (for example, a one-bit flag) indicating that base station 2 which is the final destination node receives the data (process T10 shown in FIG. 1A). In short, base station 2 sends an ACK with final destination information to relay station 3*b* as the source node (process T10 shown in FIG. 1A).

Figures 3, 4:
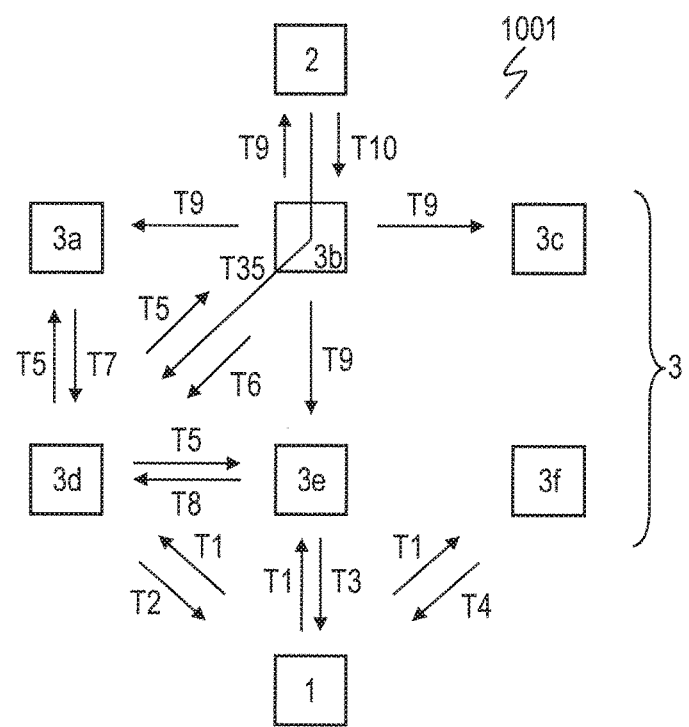
FIG. 3 shows a signal format of an acknowledgement used in the wireless communication system according to Embodiment 1.
FIG. 4 is a schematic diagram of the wireless communication system according to Embodiment 1 for illustrating a communication procedure.

FIG. 3 is a signal format of the ACK which is data to be sent in reply. The reply data contains preamble D1, data D2 called a start frame delimiter (SFD) indicating the beginning of the data, data D3 indicating the data. length, data D4 containing the ACK, and data D5 called a cyclic redundancy check (CRC) for error detection. The data D4 is tagged with a flag for final destination information and information indicating the number of relay nodes (the number of hops).

When wireless communication unit 32 of relay station 3*b* receives the

ACK sent from base station 2, MCU 39 of relay station 3*b* determines, based on the final destination information tagged with the ACK, that base station 2 has received the data sent from relay station 3*b*. As a result, relay station 3*b* establishes a communication path to base station 2. In short, when receiving the ACK from base station 2, relay station 3*b* determines, based on the final destination information tagged with the ACK, that base station 2 has received the data sent from relay station 3*b*. As a result, relay station 3*b* establishes a communication path to base station 2. Thus, when the flag of the final destination information tagged to the ACK is turned on, relay stations 3 determine that relay stations 3 can communicate with base station 2 either directly or via other relay stations 3. Relay station 3 then sets an upstream node that has sent this ACK (base station 2 or another relay station 3) as the destination node. An upstream node of a certain node (relay station 3*b*) is a node out of relay stations 3 and base station 2 as a final destination node closer to base station 2 than the certain node (relay station 3*b*) in the communication path. The upstream node can be either relay station 3 or base station 2 as the final destination node.

Base station 2 receives the data also from relay station 3*a*. MCU 29 of base station 2 determines that the data is identical to the data previously received, based on the sequence number and the branch station ID contained in the data. MCU 29 of base station 2 then allows wireless communication unit 22 to send an ACK to relay station 3*a* as the source node without setting the flag for final destination information. In short, base station 2 sends an ACK without setting the flag for final destination information to relay station 3*a* as the source node. Although the data from relay station 3*a* is received also by relay station 3*d*, MCU 39 of relay station 3*d* determined that the data is identical to the data previously received, based on the sequence number and the branch station ID contained in the data. MCU 39 of relay station 3*d* then discards the received data and allows wireless communication unit 32 to send an ACK alone to relay station 3*a* as the source node. In short, relay station 3*d* discards the received data and sends an ACK alone to relay station 3*a* as the source node.

Thus, the measured data is sent for the first time from branch station 1 to base station 2 via relay stations 3*d* and 3*b*. Relay station 3*b* determines that relay station 3*b* communicates with base station 2, based on the final destination information tagged to the ACK received from base station 2. Relay station 3*b* then sets base station 2 as the destination node. This establishes a path from relay station 3*b* to base station 2 in the entire communication path from branch station 1 to base station 2.

A communication procedure in which branch station 1 sends measured data for the second time will be described below with reference to FIG. 1B.

When the predetermined sampling interval elapses from the last measurement, MCU 19 of branch station 1 starts up from a sleep mode, and allows measurement unit 11 to measure a temperature. MCU 19 of branch station 1 stores the measured data from measurement unit 11, the sequence number, and the branch station ID. MCU 19 of branch station 1 generates data to be sent with a broadcast address as a destination address and allows wireless communication unit 13 to send the data in broadcast (process T11 shown in FIG. 1B). In short, branch station 1 generates and sends data in broadcast (process T11 shown in FIG. 1B).

The data sent in broadcast from branch station 1 is received by relay stations 3*d*, 3*e,* and 3*f*. When wireless communication unit 32 of relay station 3*d* receives the data from branch station 1. MCU 39 of relay station 3*d* allows wireless communication unit 32 to send an ACK to branch station 1 as a source node (process T12 shown in FIG. 1B). Similarly, when receiving the data from branch station 1, relay stations 3*e* and 3*f* send an ACK to branch station 1 (processes T13 and T14 shown in FIG. 1B). When the predetermined time elapses after receiving one ACK after the sending of the data, branch station 1 is switched to the sleep mode as to reduce power consumption.

MCU 39 of relay station 3*d* then generates data containing the measured data, the sequence number, and the branch station ID extracted from the data received from branch station 1 and having a broadcast address as a destination address. MCU 39 of relay station 3*d* then allows wireless communication unit 32 to send the data in broadcast (process T15 shown in FIG. 1B). In short, relay station 3*d* sends the data in broadcast (process T15 shown in FIG. 1B). The data sent in broadcast from relay station 3*d* is received by relay stations 3*a*, 3*b,* and 3*e* which are located in the communication area of relay station 3*d*. Although branch station 1 is also located in the communication area of relay station 3*d*, branch station 1 does not receive the data since branch station 1 has been in the sleep mode after receiving the ACK. Relay stations 3*e* and 3*f,* similar to relay station 3*d,* send the data received from branch station 1 in broadcast to other nodes located in the communication areas of relay stations 3*e* and 3*f*. Even if being located within the communication areas of relay stations 3*e* and 3*f,* branch station 1 does not receive the data from relay stations 3*e* and 3*f* since branch station 1 has been in the sleep mode since receiving the ACK.

Figure 1B:
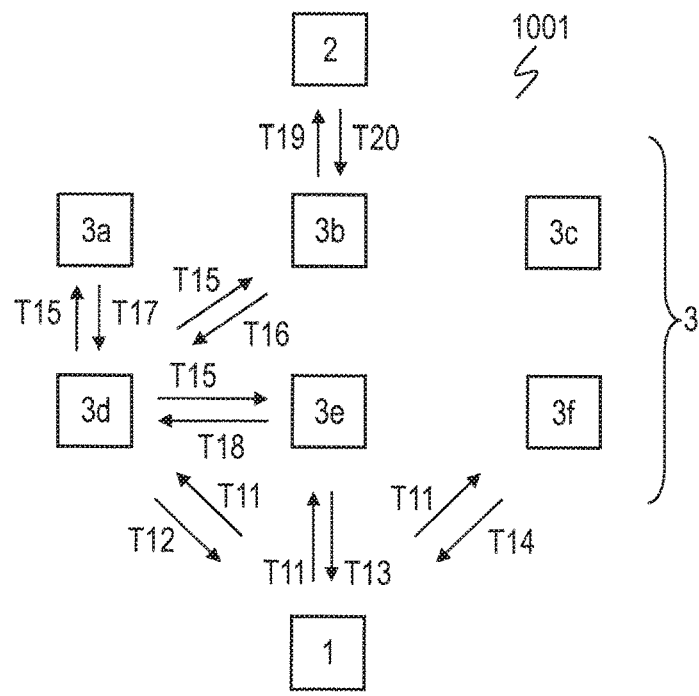
FIG. 1B is a schematic diagram of the wireless communication system according to Embodiment 1 for illustrating a communication procedure.

When wireless communication unit 32 of relay station 3*b* receives the data from relay station 3*d,* MCU 39 of relay station 3*b* allows wireless communication unit 32 to send to relay station 3*d* as a source node an ACK tagged with final destination information which has been sent from base station 2 in the last communication (process T16 shown in FIG. 1B). In short, when receiving the data from relay station 3*d,* relay station 3*b* sends to relay station 3*d* as the source node an ACK tagged with the final destination information which has been sent from base station 2 in the last communication (process T16 shown in FIG. 1B). When wireless communication unit 32 of relay station 3d receives the ACK from relay station 3b, MCU 39 of relay station 3d determined that relay station 3b is a relay station (node) communicating with base station 2, based on the final destination information tagged to the ACK. MCU 39 of relay station 3d then sets relay station 3b as a destination node. As a result, relay station 3d establishes a communication path to base station 2. Similarly, when receiving the data from relay station 3d, relay stations 3a and 3e send an ACK to relay station 3d (processes T17 and T18 shown in FIG. 1B).

MCU 39 of relay station 3b then generates data containing the measured data, the sequence number, and the branch station ID extracted from the data received from relay station 3d and having the address of base station 2 specified as a destination address. MCU 39 of relay station 3b then allows wireless communication unit 32 to send the data in unicast to base station 2 (process T19 shown in FIG. 1B). In short, relay station 3b sends the data in unicast to base station 2 (process T19 shown in FIG. 1B). When wireless communication unit 22 of base station 2 receives the data from relay station 3b, MCU 29 of base station 2 extracts the measured data, the sequence number, and the branch station ID from the received data. MCU 29 of base station 2 then allows wireless communication unit 22 to send an ACK to relay station 3b as a source node (process T20 shown in FIG. 1B). In short, base station 2 sends an ACK to relay station 3b as the source node (process T20 shown in FIG. 1B). This completes the series of operations to send data from branch station 1 to base station 2.

Thus, the measured data is sent for the second time from branch station 1 to base station 2 via relay stations 3d and 3b. Relay station 3d sets relay station 3b as the destination node, based on the final destination information tagged to the ACK received from relay station 3b. This establishes a path from relay station 3d to base station 2 in the entire communication path from branch station 1 to base station 2.

A communication procedure in which branch station 1 sends measured data for the third time will be described below with reference to FIG. 1C.

When the predetermined sampling interval elapses from the last measurement, MCU 19 of branch station 1 starts up from the sleep mode, and allows measurement unit 11 to measure a temperature. MCU 19 of branch station 1 stores the measured data from measurement unit 11, the sequence number, and the branch station ID. MCU 19 of branch station 1 generates data to be sent with a broadcast address as a destination address, and allows wireless communication unit 13 to send the data in broadcast (process T21 shown in FIG. 1C). In short, branch station 1 generates data and sends the data in broadcast (process T21 shown in FIG. 1C).

The data sent in broadcast from branch station 1 is received by relay stations 3d, 3e, and 3f. When wireless communication unit 32 of relay station 3d receives the data from branch station 1, MCU 39 of relay station 3d allows wireless communication unit 32 to send to branch station 1 as a source node an ACK tagged with the final destination information which has been sent from relay station 3b in the last communication (process T22 shown in FIG. 1C). In short, when receiving the data from branch station 1, relay station 3d sends branch station 1 as a source node an ACK tagged with the final destination information which has been sent from relay station 3b in the last communication (process T22 shown in FIG. 1C). When wireless communication unit 13 of branch station 1 receives the ACK from relay station 3d, MCU 19 of branch station 1 determined that relay station 3d is a relay station communicating with base station 2, based on the final destination information tagged to the ACK. MCU 19 of branch station 1 then sets relay station 3d as a destination node. This establishes a communication path from branch station 1 to base station 2. Similarly, when receiving the data from branch station 1, relay stations 3e and 3f send an ACK to branch station 1 (processes T23 and T24 in FIG. 1C). When the predetermined time elapses from receiving one ACK after the sending of the data, branch station 1 is switched to the sleep mode as to reduce power consumption.

MCU 39 of relay station 3d then generates data containing the measured data, the sequence number, and the branch station ID extracted from the data received from branch station 1 and having the address of relay station 3b specified as the destination address. MCU 39 of relay station 3d then allows wireless communication unit 32 to send the data in unicast (process T25 shown in FIG. 1C). In short, relay station 3d generates and sends data in unicast to relay station 3b (process T25 shown in FIG. 1C). Relay stations 3e and 3f send the data received from branch station 1 in broadcast similarly to relay station 3d, which is not described here.

Figure 1C:
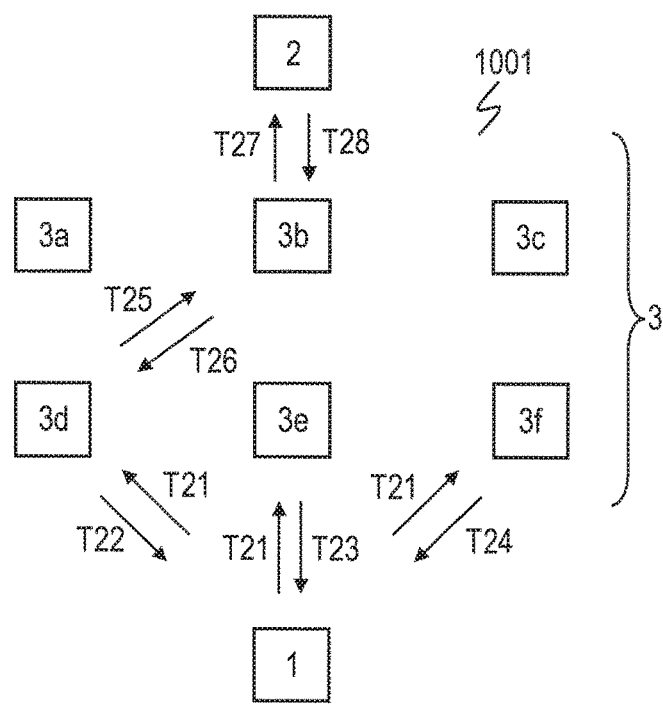
FIG. 1C is a schematic diagram of the wireless communication system according to Embodiment 1 for illustrating a communication procedure.

When wireless communication unit 32 of relay station 3b receives the data from relay station 3d, MCU 39 of relay station 3b sends an ACK to relay station 3d as a source node (process T26 shown in FIG. 1C).

MCU 39 of relay station 3b then generates data containing the measured data, the sequence number, and. the branch station ID extracted from the data received from relay station 3d and having the address of base station 2 specified as the destination address. MCU 39 of relay station 3b then allows wireless communication unit 32 to send the data in unicast (process T27 shown in FIG. 1C). In short, relay station 3b sends the data in unicast to base station 2 (process T27 shown in FIG. 1C). When wireless communication unit 22 of base station 2 receives the data from relay station 3b, MCU 29 of base station 2 extracts the measured data, the sequence number, and the branch station ID from the received data. MCU 29 of base station 2 then allows wireless communication unit 22 to send an ACK to relay station 3b as a source node (process T28 shown in FIG. 1C). In short, base station 2 sends an ACK to relay station 3b as the source node (process T28 shown in FIG. 1C). This completes a series of operations to send data from branch station 1 to base station 2.

Thus, the measured data is sent for the third time from branch station 1 to base station 2 via relay stations 3d and 3b. Branch station 1 determines that relay station 3d communicates with base station 2, based on the final destination information tagged to the ACK received from relay station 3d. Branch station 1 then sets relay station 3d as the destination node. This establishes the communication path from branch station 1 to base station 2.

A communication procedure in which branch station 1 sends measured data for the fourth and subsequent times will be described below with reference to FIG. 1D.

When the predetermined sampling interval elapses from the last measurement, MCU 19 of branch station 1 starts up from the sleep mode, and allows measurement unit 11 to measure a temperature. MCU 19 of branch station 1 stores the measured data from measurement unit 11, the sequence number, and the branch station ID. MCU 19 of branch station 1 generates data to be sent which has the address of relay station 3d specified as a destination address, and allows wireless communication unit 13 to send the data in unicast (process T29 shown in FIG. 1D). In short, branch station 1 generates and sends data in unicast to relay station 3d (process T29 shown in FIG. 1D).

The data sent in unicast from branch station 1 is received by relay station 3d. Then, relay station 3d sends an ACK to branch station 1 as a source node (process T30 shown in FIG. 1D). When the predetermined time elapses from the receiving of this ACK after the sending of the data, branch station 1 is switched to the sleep mode as to reduce power consumption.

When receiving the data from branch station 1, MCU 39 of relay station 3d generates data containing the measured data, the sequence number, and the branch station ID and having the address of relay station 3b specified as a destination address. MCU 39 of relay station 3d then allows wireless communication unit 32 to send the data in unicast (process T31 shown in FIG. 1D). In short, relay station 3d sends the data in unicast to relay station 3b (process T31 shown in FIG. 1D).

Figure 1D:
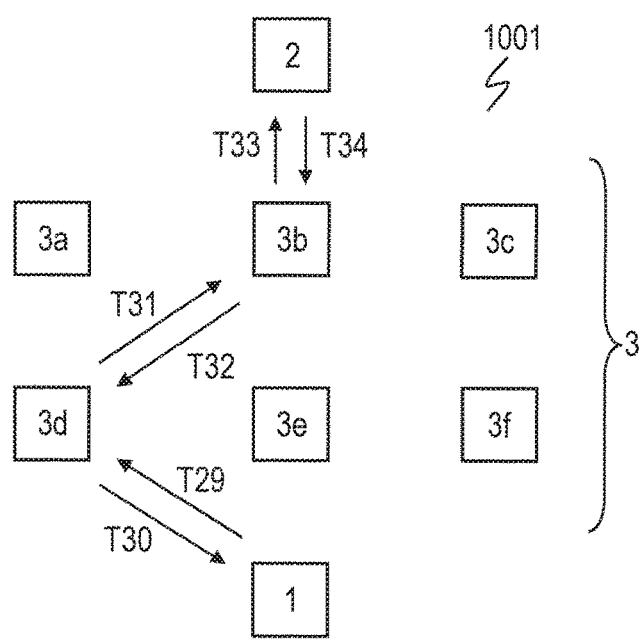
FIG. 1D is a schematic diagram of the wireless communication system according to Embodiment 1 for illustrating a communication procedure.

When receiving the data from relay station 3d, relay station 3b sends an ACK to relay station 3d as a source node (process T32 shown in FIG. 1D).

MCU 39 of relay station 3b then generates data containing the measured data, the sequence number, and the branch station ID extracted from the data received from relay station 3d and having the address of base station 2 specified as a destination address. MCU 39 of relay station 3b then allows wireless communication unit 32 to send the data in unicast (process T33 shown in FIG. 1D). In short, relay station 3b sends the data in unicast to base station 2 (process T33 shown in FIG. 1D).

When wireless communication unit 22 of base station 2 receives the data from relay station 3b, MCU 29 of base station 2 extracts the measured data, the sequence number, and the branch station II) from the received data. MCU 29 of base station 2 then allows wireless communication unit 22 to send an ACK to relay station 3b as a source node (process T34 shown in FIG. 1D). In short, base station 2 sends an ACK to relay station 3b as the source node (process T34 shown in FIG. 1D). This completes a series of operations to send data from branch station 1 to base station 2.

After the communication path from branch station 1 to base station 2 is established, each node located in the communication path from branch station 1 to base station 2 sends data in unicast. This reduces the number of ACKs to be sent than the case that each node sends data in broadcast, thereby reducing data traffic and the probability of data collision.

In the network system disclosed in PTL 1, on the other hand, the request packet sent in broadcast from the base station node to a specific branch node is relayed by nodes, thereby establishing a communication path between the base station node and the destination branch node. Therefore, when the communication path to the base station node is not established, the branch node cannot send the data of the measurement device and has to wait for a request packet sent from the base station node. This may takes a long time to establish the communication path.

Wireless communication system 1001 according to Embodiment 1 includes branch station 1 (a first node) as the source node having a wireless communication function, base station 2 (a second node) as the destination node having a wireless communication function, and plural relay stations 3 (third nodes). Relay stations 3 have a function of relaying wireless communication between branch station 1 and base station 2. When a communication path is not established to send data from branch station 1 to base station 2, branch station 1 and relay stations 3 send data in broadcast. After a node (branch station 1 and relay stations 3) determines a destination node in at least a part of the communication path from branch station 1 to base station 2, the node sends data in unicast to the determined destination node.

Thus, when the communication path is not established, branch station 1 and relay stations 3 send data in broadcast. Therefore, data from branch station 1 is sent to base station 2 either directly or via relay stations 3. After at least a certain node (branch station 1 and relay stations 3) determines a destination node in at least a part of the communication path, the certain node sends data in unicast to the determined node. This reduces the number of ACKs to he sent than the case that each node sends data in broadcast, thereby reducing data traffic and avoid data collision.

In wireless communication system 1001, when receiving data from branch station 1, base station 2 sends an ACK tagged with final destination information indicating that base station 2, which is the final destination node, receives the data. Therefore, the node (branch station 1 or relay station 3) that receives this ACK determines that the node can communicate with base station 2 and sets the base station as the destination node.

Wireless communication system 1001 performs the following processes. When receiving an ACK tagged with final destination information from an upstream node (base station 2 or another relay station 3) in the communication path and then receiving the next data from a downstream node (branch station 1 or another relay station 3) in the communication path, relay station 3 sends an ACK tagged with the final destination information to the downstream node. A downstream node of a certain node is a node out of relay stations 3 and branch station 1 closer to branch station 1 than the certain node in the communication path. The downstream node can be branch station 1.

Thus, when receiving an ACK tagged with final destination information from an upstream node and then receiving the next data, relay station 3 sends an ACK tagged with the final destination information to a downstream node. As a result, destination nodes are determined sequentially while sending an ACK from the upstream node to the downstream node.

In wireless communication system 1001, when base station 2 receives data from branch station 1, base station 2 preferably traces the communication path, along which the data has been sent, back to relay station 3 that directly communicates with branch station 1, and sends the final destination information relay station 3 before branch station 1 sends the next data.

FIG. 4 shows the above communication procedure of wireless communication system 1001. Similarly to the first sending of data from branch station 1 to base station 2 described with reference to FIG. 1A, the measured data from branch station 1 is sent to relay station 3b via relay station 3d. Relay station 3b sends data containing the measured data in broadcast (process T9 shown in FIG. 4). When receiving the data from relay station 3b, base station 2 sends an ACK tagged with final destination information to relay station 3b as a source node (process T10 shown in FIG. 4). Relay station 3b determines that relay station 3b communicates with base station 2, based on the final destination information tagged to the ACK sent from base station 2. This establishes a path. between relay station 3b and base station 2. Base station 2 then traces back the communication path from base station 2 to branch station 1. Base station 2 then sends a dedicated command tagged with the final destination information simultaneously to all nodes to relay station 3d which is a node immediately upstream of branch station 1 and which can directly communicate with branch station 1 (process T35 shown in FIG. 4). This dedicated command is relayed. along the communication path backward to relay station 3d. Relay station 3 (relay station 3d in the example shown in FIG. 4) that has received the dedicated command determines that relay station 3d is one of the nodes constituting the communication path from branch station 1 to base station 2, based on the final destination information tagged to the dedicated command. Relay station 3 then sets, as the destination node, the upstream node that performs direct communication with it. This establishes a communication path from the upstream node (relay station 3d) of branch station 1 to base station 2 at once. As a result, relay station 3d which is in the communication path can determine a destination node of relay station 3d. Thus, branch station 1 sends the next data in unicast to each of the upstream nodes and base station 2, hence establishing the communication path in a short time. When branch station 1 sends the next data in broadcast, an ACK tagged with the final destination information is sent in reply to branch station 1 from relay station 3d, thereby establishing a communication path from branch station 1 to base station 2.

According to Embodiment 1, base station 2 and relay station 3 may have a longer reply time to send an ACK after receiving data in broadcast from a downstream node in the communication path than after receiving data in unicast from a downstream node in the communication path.

Figure 5:
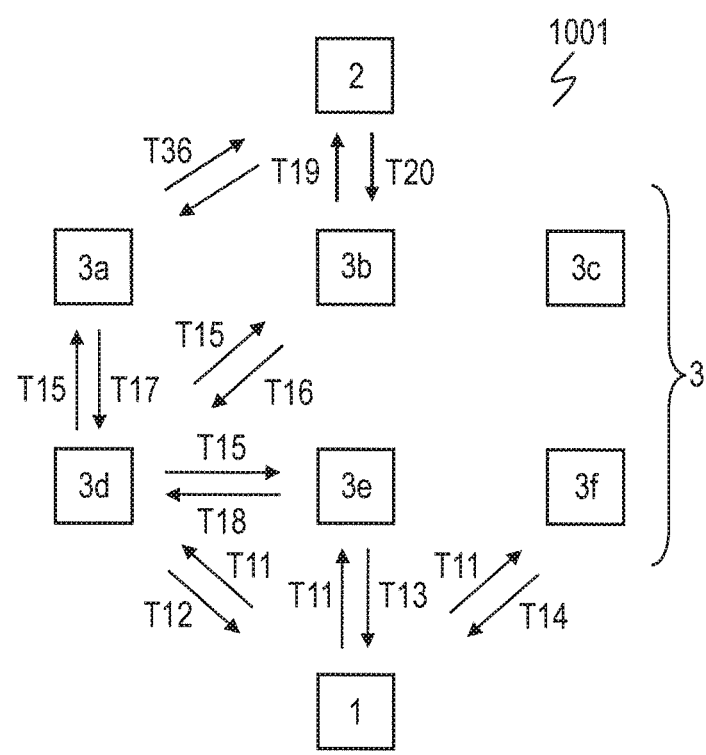
FIG. 5 is a schematic diagram of the wireless communication system according to Embodiment 1 for illustrating a communication procedure.

FIG. 5 shows the above communication procedure. As described with reference to FIG. 1B, when data is sent from branch station 1 after relay station 3b has determined the destination node, the data sent in broadcast from relay station 3d is received by relay stations 3a and 3b. Relay station 3a which has not determined the destination node sends the data containing the measured data received from relay station 3d in broadcast (process T36 shown in FIG. 5). Meanwhile, relay station 3b which has set base station 2 as the destination node sends the data containing the measured data received from relay station 3d in unicast to base station 2 (process T19 shown in FIG. 5).

Base station 2 sends an ACK at a longer time after receiving data in broadcast from a downstream node than after receiving data in unicast from the downstream node. As a result, base station 2 can send the ACK earlier to relay station 3b than to relay stations 3 other than relay station 3b. Relay station 3b is the node which has sent the data in unicast, or in other words, which is in the established communication path (process T20 shown in FIG. 5).

Relay station 3, similarly to base station 2, sends an ACK at a longer time after receiving data in broadcast from a downstream node (another relay station 3) than after receiving data in unicast from the downstream node. As a result, relay station 3 also can send an ACK earlier to the downstream relay station 3 than to the other relay stations 3. The downstream relay station 3 is the node which has sent the data in unicast, or in other words, which is in the established communication path.

In wireless communication system 1001, base station 2 preferably sends an ACK at a shorter time after receiving data in broadcast than relay stations 3. As shown in FIG. 1A, data sent in broadcast from relay station 3b (process T9) is received by not only base station 2 but also relay stations 3a and 3c to 3f. Therefore, relay stations 3a and 3c to 3f also send an ACK to relay station 3b. Base station 2 sends an ACK in a shorter time after receiving the data than relay stations 3a and 3c to 3f. Thus, the ACK of base station 2 is sent earlier to relay station 3b as the source node than the other relay stations 3. This reduces the time to establish the communication path.

Communication may be impossible due to a trouble after the establishing of the communication path from branch station 1 to base station 2. In this case, wireless communication system 1001 re-establishes a communication path as follows. If it becomes impossible to send data to an upstream node in a communication path after the communication path to base station 2 is established, branch station 1 and relay station 3 resend the data in unicast to the upstream node. If the resending fails, branch station 1 and relay station 3 send the data to the upstream node in broadcast to re-establish a communication path to base station 2.

Figure 6A:
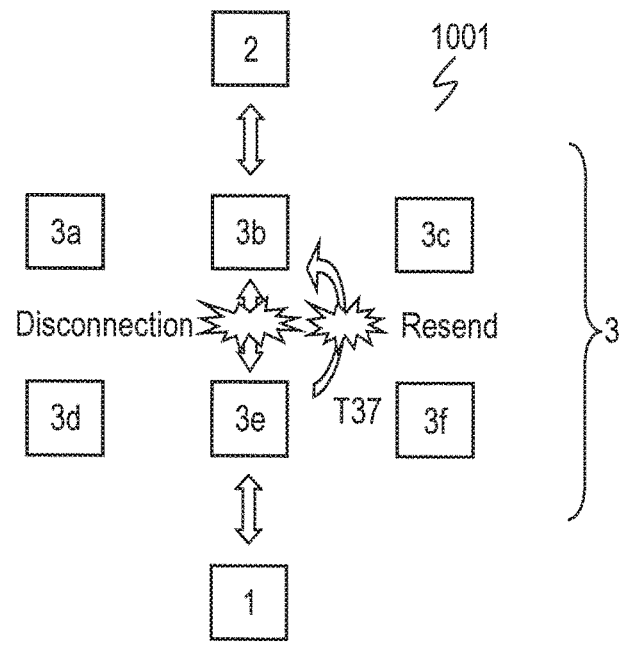
FIG. 6A is a schematic diagram of the wireless communication system according to Embodiment 1 for illustrating a communication procedure.
Figure 6B:
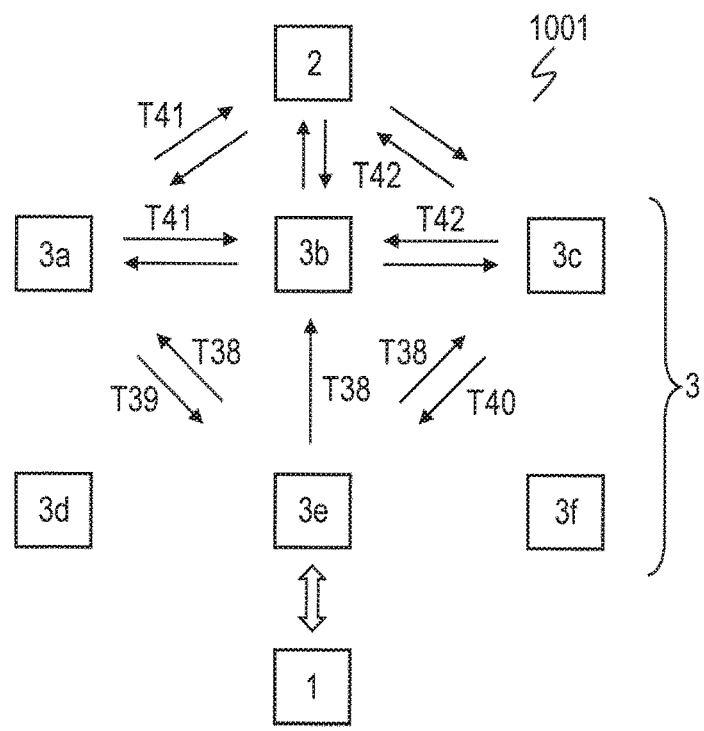
FIG. 6B is a schematic diagram of the wireless communication system according to Embodiment 1 for illustrating a communication procedure.

FIGS. 6A and 6B show the above communication procedure. If communication becomes impossible between relay stations 3e and 3b while branch station 1 sends data in unicast to base station 2 via relay stations 3e and 3b, relay station 3e first resends the data in unicast to relay station 3b (process T37 shown in FIG. 6A). If communicate with relay station 3b fails again due to a malfunction of relay station 3b, a deteriorating communication environment, or other reasons, relay station 3e sends the data in broadcast in order to re-establish a communication path (process T38 shown in FIG. 6B). Relay stations 3a and 3c receive the data sent in broadcast from relay station 3e and sends an ACK to relay station 3e as a source node (processes T39 and T40 shown in FIG. 6B). When receiving the data from relay station 3e, relay stations 3a and 3c each send measured data in broadcast (processes T41 and T42 shown in FIG. 6B). When receiving the data from either relay station 3a or 3c, base station 2 sends an ACK with a flag which is turned on as final destination information to relay station 3 (relay station 3a or 3c) as the source node that has send the data. Every time branch station 1 sends data, an ACK with the turned on flag for the final destination information is sent sequentially to downstream nodes to establish a new communication path.

It is preferable to use the following communication procedure in wireless communication system 1001. For determining a destination node, when an ACK received from an upstream node has a received signal strength indicator (RSSI) less than a predetermined threshold, branch station 1 or relay station 3 does not determine the upstream node to be the destination node, and excludes this upstream node from candidates of the destination node.

Figure 7:
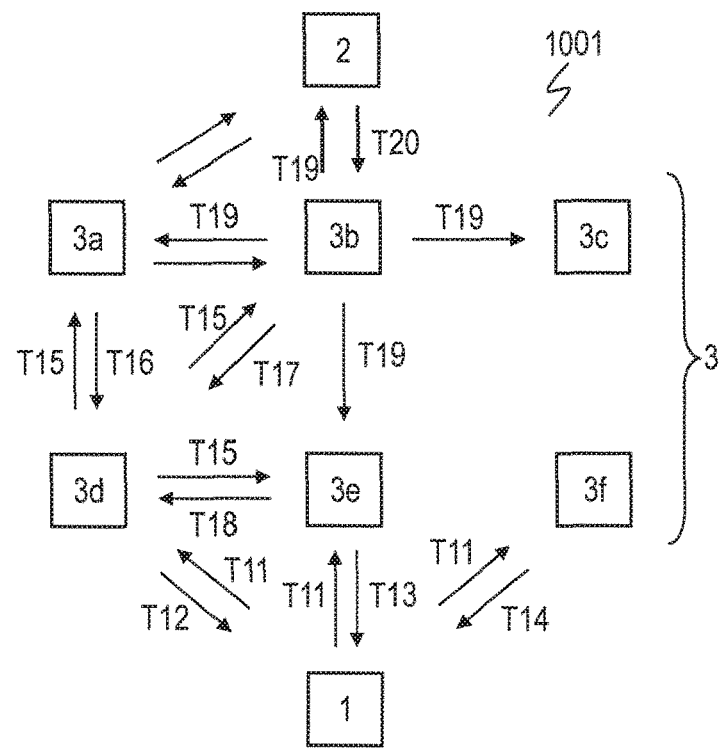
FIG. 7 is a schematic diagram showing a communication procedure of the wireless communication system according to the first exemplary embodiment.

FIG. 7 shows the above communication procedure. In the case that relay station 3d receives measured data from branch station 1, generates data from the measured data, and sends the generated data via broadcast while a communication path is not established, the data is received by relay stations 3a, 3b, and 3e. After that, when relay station 3b located in the communication area of base station 2 sends the measured data in broadcast (process T19 shown in FIG. 7), the measured data is received by base station 2. Base station 2 then sends an ACK tagged with final destination information to relay station 3b as the source node (process T20). Relay station 3b determines that the ACK has been sent from base station 2, based on the flag for the final destination information tagged to the ACK, and compares the received signal strength indicator (RSSI) of the ACK with a predetermined threshold. If the indicator is less than this threshold, relay station 3b does not determine base station 2 to be the destination node and excludes base station 2 from the candidates of the destination node. If, on the other hand, the indicator is not less than the threshold, relay station 3b sets base station 2 as the destination node. Thus, a node with a received signal strength indicator less than the threshold is excluded from the candidates of the destination node while a node with a received signal strength indicator not less than the threshold is set as the destination node, thereby providing stable communication.

In wireless communication system 1001, relay station 3 may fail to send data to an upstream node. In this case, relay station 3 cannot send an ACK with information that communication with the upstream node is impossible when relay station 3 receives next data from a downstream node. From this information, the downstream node (branch station 1 or a downstream relay station 3) determines that a malfunction occurs in communication with base station 2. Therefore, the downstream node, for example, increases the transmission interval so as to reduce the number of times of sending data, thereby reducing power consumption.

According to Embodiment 1, base station 2 and relay station 3 preferably do not send an ACK in reply to data received from a downstream node (branch station 1 or relay station 3) if another node has already sent an ACK for the same data to the downstream node.

Figure 8:
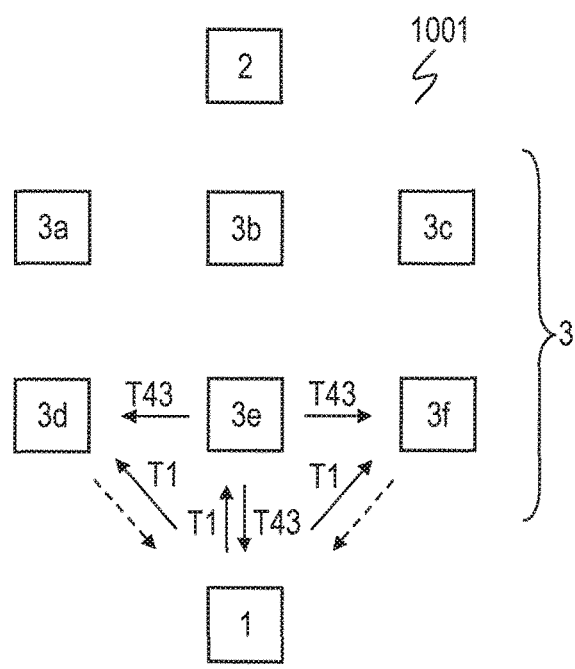
FIG. 8 is a schematic diagram of the wireless communication system according to Embodiment 1 for illustrating a communication procedure.

FIG. 8 shows the above communication procedure. When branch station 1 sends data to base station 2 in broadcast while a communication path is not established, the data is received by relay stations 3d, 3e, and 3f located in the communication area of branch station 1. After receiving the data from branch station 1, relay stations 3d, 3e, and 3f send an ACK signal when a reply time elapses. Each relay station 3 has a reply time set individually. If one of relay stations 3d, 3e, and 3f has already sent an ACK in reply to the same data, the other relay stations 3 do not send an ACK.

Relay stations 3d, 3e, and 3f are in reception state even after receiving the data until the reply time elapses. When relay station 3e sends an ACK (process T43 shown in FIG. 8), the ACK is received also by relay stations 3d and 3f. This ACK contains the sequence number of the received data. MCU 39 of each of relay stations 3d and 3f determines that the ACK for the same data has been sent from relay station 3e, based on the sequence number contained in the ACK, and therefore, does not send an ACK. As a result, only one ACK is sent for individual data, thereby reducing the total number of ACKs and avoiding data collision.

In wireless communication system 1001, when receiving the same data as sent before, relay station 3 preferably discards the data, and sends an ACK to the source node.

Figure 9A:
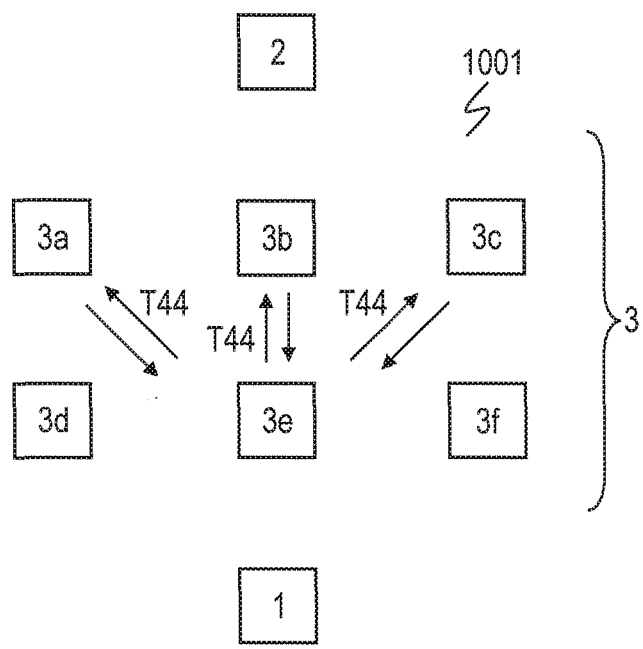
FIG. 9A is a schematic diagram of the wireless communication system according to Embodiment 1.
Figure 9B:
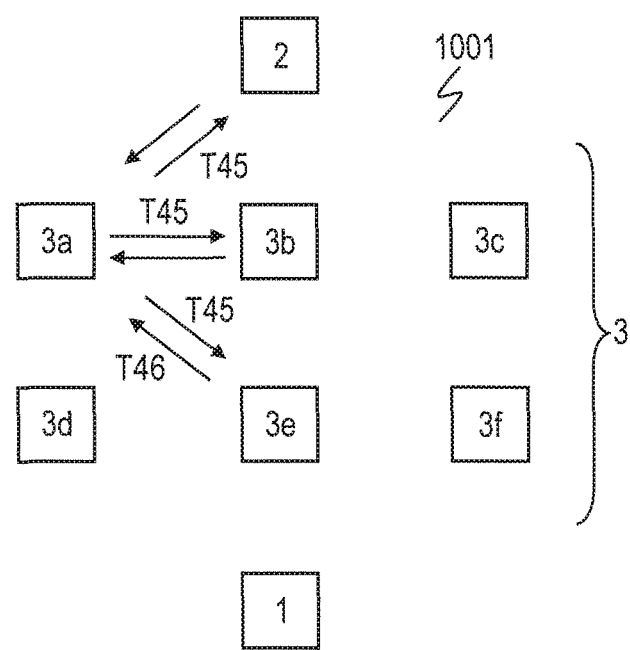
FIG. 9B is a schematic diagram of the wireless communication system according to Embodiment 1 for illustrating a communication procedure.

While a communication path is not established, relay station 3 sends data in broadcast. Therefore, when another relay station 3 may receive data from a certain relay station 3 and then, may send the received data in broadcast, the certain relay station 3 may receive data identical to the data sent before. FIGS. 9A and 9B schematically shows this communication procedure. As shown in FIGS. 9A and 9B, when relay station 3e sends data in broadcast (process T44), relay station 3a receives and sends the data in broadcast (process T45). As a result, relay station 3e receives data identical to the sent same sent. In this case, relay station 3e sends an ACK to relay station 3a as the source node (process T46) and discards the received data. When receiving the ACK, relay station 3a as the source node determines that the data has been successfully sent. Meanwhile, relay station 3e, which has received the data identical to the data sent before discards the data. This prevents relay station 3 from sending the same data sent again, thereby reducing data traffic and avoiding signal collision.

In wireless communication system 1001, when one of relay stations 3 is connected to, for example, a power meter and base station 2 needs to acquire a measured value of the power meter, a communication path can be established between base station 2 and relay station 3 connected to the power meter as described below.

The communication procedure in this case will be described with reference to FIG. 10. In the example shown in of FIG. 10, relay station 3f is connected to power meter 4.

Figure 10:
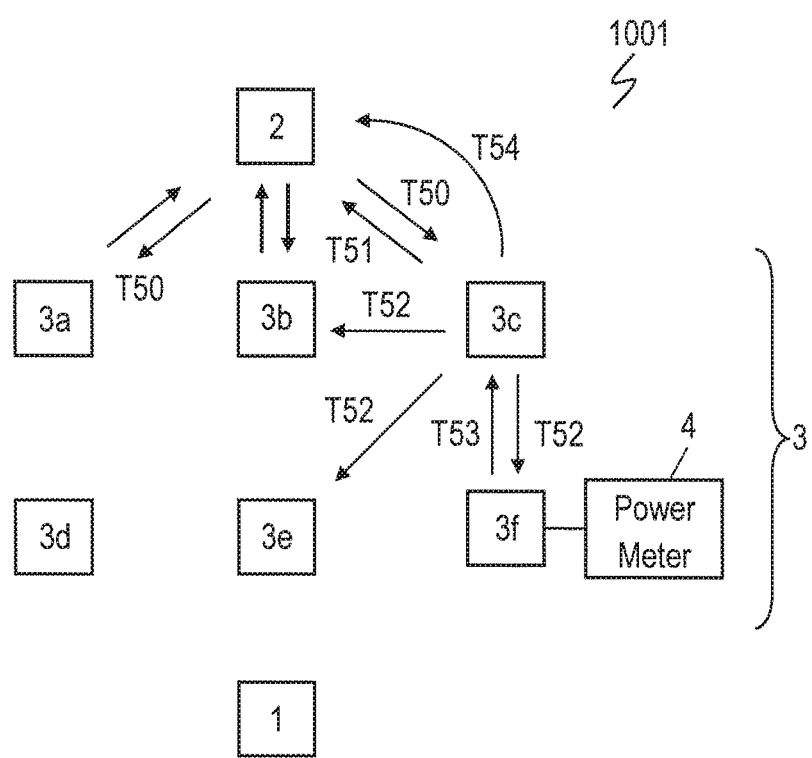
FIG. 10 is a schematic diagram of the wireless communication system according to Embodiment 1 for illustrating a communication procedure.

Since base station 2 does not have a communication path to relay station 3 connected to power meter 4, base station 2 sends, in broadcast, a request signal requesting the measured value by specifying an ID of power meter 4 (process T50 shown in FIG. 10). The request signal sent in broadcast from base station 2 is received by relay stations 3a, 3b, and 3c located in the communication area of base station 2. When receiving the request signal from base station 2, relay station 3c sends an ACK to base station 2 as a source node (process T51) and then sends the request signal in broadcast (process T52). Relay stations 3a and 3b, similarly to relay station 3c, send an ACK to base station 2 as the source node and then send the request signal in broadcast. The request signal sent in broadcast from relay station 3c is received by relay station 3f connected to power meter 4. Relay station 3f determines that base station 2 requests the measured value of power meter 4 connected to relay station 3f, based on the ID of power meter 4 tagged to the request signal, and sends the measured value in unicast to relay station 3c as a source node (process T53). The data from relay station 3f to relay station 3c is tagged with a flag for final destination information indicating that relay station 3f can communicate with power meter 1 When receiving the data, relay station 3c determines that relay station 3f can communicate with power meter 4, based on the flag for final destination information tagged to the received data. Relay station 3c then sets relay station 3f as the destination node for acquiring the measured value of power meter 4. When receiving the data (the measured value of power meter 4) from relay station 3f, relay station 3c sends the data in broadcast (process T54). The data sent in broadcast from relay station 3c is received, by base station 2 which is located in the communication area of relay station 3c, thereby allowing base station 2 to acquire the measured value of power meter 4.

After that, if base station 2 sends a request signal again in broadcast while specifying the ID of power meter 4 in order to acquire the measured value, relay station 3c receives this signal and sends an ACK with a flag for final destination information to base station 2. As a result, base station 2 can acquire, based on the final destination information tagged to the ACK sent from relay station 3c, the information about a communication path to relay station 3f connected. to power meter 4. In other words, base station 2 can determine the node (relay station 3c) to which the request signal is to be sent directly in the established communication path. From the next time, base station 2 can send a request signal in unicast to relay station 3c and acquire the measured value of power meter 4.

In the case that wireless communication system 1001 performs the communication procedure shown in FIG. 10, base station 2 and relay station 3 preferably do not send an ACK in reply to data received from a downstream node if another node has already sent an ACK for the same data to the downstream node.

When base station 2 sends a request signal to acquire measured data via broadcast while a communication path between base station 2 and relay station 3f connected to power meter 4 is not established, the data is received by relay stations 3a, 3b, and 3c located in the communication area of base station 2. After receiving the request signal from base station 2, relay stations 3a, 3b, and 3c send an ACK when the reply time elapses. The reply time is set individually for each relay station. If one of relay stations 3a, 3b, and 3c has already sent an ACK in reply to the same data, the other relay stations do not send an ACK. The measured data from relay station 3f is sent from relay station 3c in broadcast and is received by base station 2 and relay stations 3b and 3e, which are located in the communication area of relay station 3c. When receiving the data from relay station 3c, base station 2 and relay stations 3b and 3e send an ACK. However, if one of the stations has already sent an ACK in reply to the same data, the other stations do not send an ACK. This reduces the number of ACKs to be sent from relay stations, thereby reducing data traffic and avoid data collision.

Exemplary Embodiment 2

Figure 11:
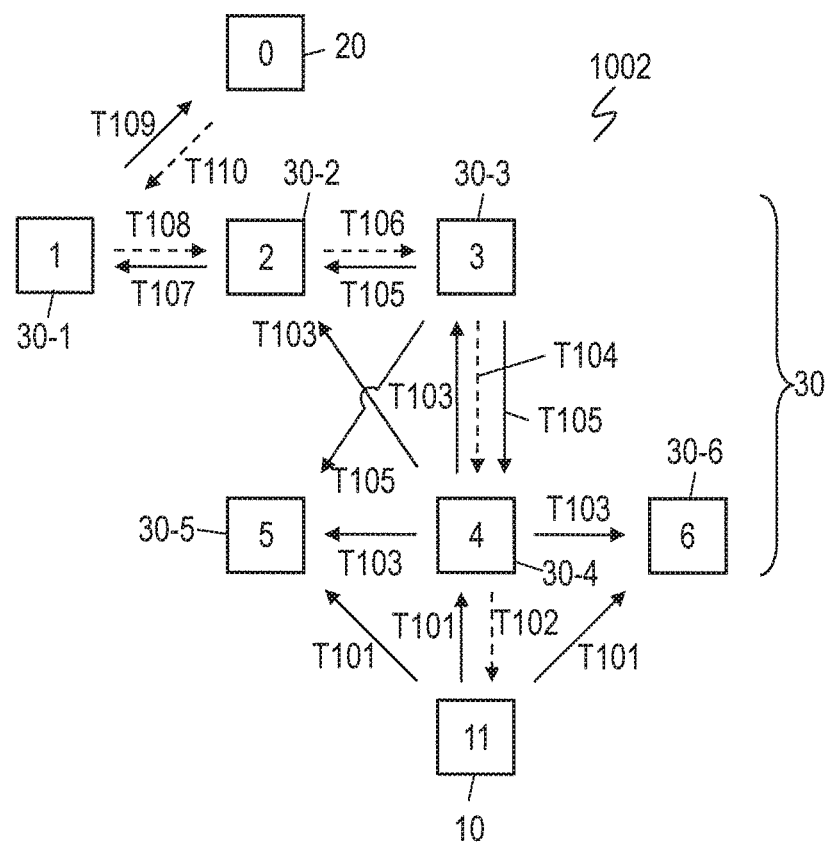
FIG. 11 is shows a communication path of a wireless communication system according to Exemplary Embodiment 2 for illustrating a communication procedure.

FIG. 11 is a schematic diagram of wireless communication system 1002 according to Exemplary Embodiment 2. Wireless communication system 1002 includes branch station 10 (first node) which is a source node, base station 20 (second node) which is a destination node, and one or more relay stations 30 (third nodes) which are one or more nodes for relaying wireless communication between branch station 10 and base station 20. System 1002 includes six relay stations 30, but may include one or any number of relay stations 30 required for signal relay. Wireless communication system 1002 includes one branch station 10 as the source node, but may alternatively include plural branch stations 10 as the source nodes, according to the need. In wireless communication system 1002, data is sent from branch station 10 to base station 20. Alternatively, when relay station 30 is connected to a sensor for measuring a physical quantity, base station 20 may send data to relay station 30 and request the measured data of the sensor. In this case, base station 20 is the first node as the source node to send the request data, whereas relay station 30, to which the measured data is requested by base station 20, is the second node as the destination node.

Each of branch station 10, base station 20, and relay stations 30 includes a wireless communication function, such as a communication system is a specified low power radio system, which does not require a radio license. The communication system with the wireless communication function provided in each of branch station 10, base station 20, and relay stations 30 may be compliant with, for example, the Institute of Electrical and Electronics Engineers, Inc. (IEEE) 802.15.1 or IEEE 802.11.

Branch station 10 and base station 20 directly communicate with each other wirelessly when both stations are located within communication areas thereof and their communication environment is reliable. Meanwhile, when branch station 10 and base station 20 cannot directly communicate with each other or the communication environment is not reliable, branch station 10 and base station 20 perform wireless communication via relay station 30. In order to relay wireless communication between branch station 10 and base station 20, relay stations 30 adjacent to each other are located within communication areas thereof, thereby establishing a relay network among branch station 10, base station 20, and plural relay stations 30.

Branch station 10, base station 20, and relay stations 30 have different node numbers (identification information) assigned thereto, so that the nodes in the network can be distinguished from one another. In wireless communication system 1002, branch station 10 has a node number "11", and base station 20 has a node number "0". Six relay stations 30 are referred to as relay stations 30-1 to 30-6 having node numbers "1" to "6", respectively. In FIG. 11, the numerals shown in square boxes denoting branch station 10, base station 20, and relay stations 30 represent the node numbers assigned to the respective nodes.

Figure 12:
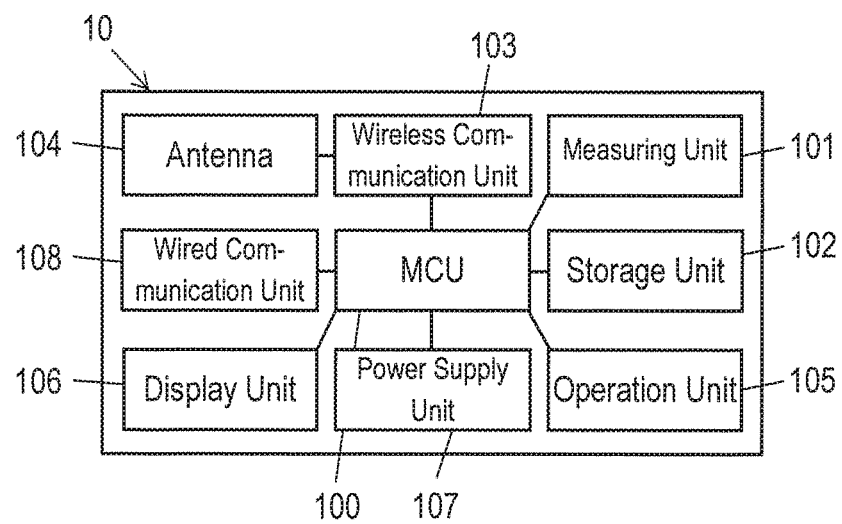
FIG. 12 is a block diagram of a branch station in the wireless communication system according to Embodiment 2.

The configuration of each of branch station 10, base station 20, and relay station 30 will be described below. FIG. 12 is a block diagram of branch station 10. Branch station 10 includes micro control unit (MCU) 100, measurement unit 101, storage unit 102, wireless communication unit 103, antenna 104, operation unit 105, display unit 106, power supply unit 107, and wired communication unit 108. Branch station 10 wirelessly sends data, which is measured by measurement unit 101, to base station 20 every time a predetermined transmission interval elapses.

Measurement unit 101 includes, for example, a thermistor having a resistance changing according to an ambient temperature. Measurement unit 101 measures the resistance of the thermistor, and hence, measures the ambient temperature. Measurement unit 101 can measure any physical quantity, such as ambient humidity, ambient illuminance, or the power consumption of an electric device, other than the temperature, according to the purpose of use.

Storage unit 102 is implemented by, e.g. an electrically erasable and programmable read-only memory (EEPROM) or an electrically rewritable nonvolatile memory, such as a flash memory. Storage unit 102 stores, e.g. identification information (for example, an address or a node number) assigned to branch station 10, measured data from measurement unit 101, information about the destination node, information about candidate nodes, and communication path information. MCU 100 reads and writes the data in storage unit 102.

Wireless communication unit 103 is composed of a wireless module compliant with the standard of, for example, the specified low power radio communication, and sends and receives wireless signals through antenna 104. Wireless communication unit 103 also has the function of measuring the received signal strength indicator of a received signal.

Wired communication unit 108 is connected to, for example, a setting device through a communication line so as to perform wired communication.

Operation unit 105 is used to set, e.g. the upper and lower limits of a measurement range of measurement unit 101, a measurement interval, and the transmission interval of measured data. Operation unit 105 is also used to set the upper limit of the number of candidate nodes stored in storage unit 102.

Display unit 106 is implemented by e.g. one or more light emitting diodes turned on and off under control of MCU 100.

Power supply unit 107 is energized by, for example, a battery and supplies power to an internal circuit of branch station 10 for its operation.

MCU 100 entirely controls branch station 10 by executing a program installed therein. MCU 100 starts up from a sleep mode at a predetermined sampling interval to allow storage unit 102 to store measured data measured by measurement unit 101. MCU 100 allows wireless communication unit 103 to wirelessly send the measured data stored in storage unit 102 every time the transmission interval elapses. The transmission interval ranges, for example, from a few seconds to a few minutes, which is longer than the above-mentioned sampling interval. MCU 100 reduces the power consumption of branch station 10 by placing branch station 10 in the sleep mode except while measurement unit 101 is measuring data and while wireless communication unit 103 is wirelessly sending the measured data.

Figure 13:
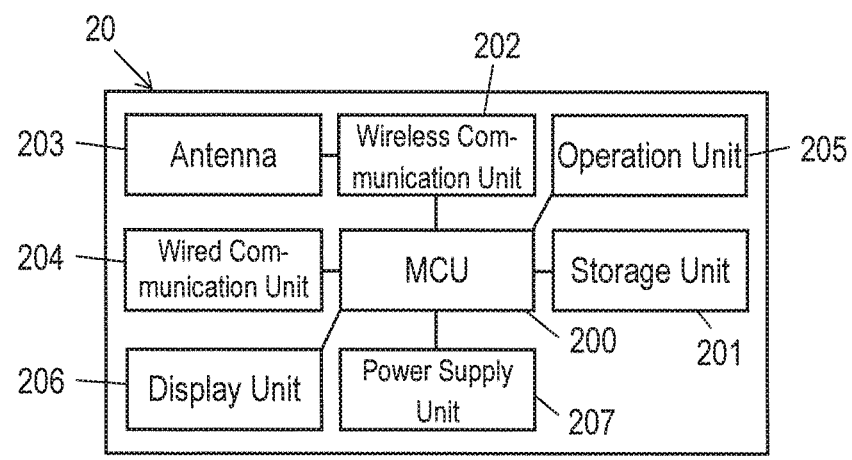
FIG. 13 is a block diagram of a base station in the wireless communication system according to Embodiment 2.

FIG. 13 is a block diagram of base station 20. Base station 20 includes MCU 200, storage unit 201, wireless communication unit 202, antenna 203, wired communication unit 204, operation unit 205, display unit 206, and power supply unit 207.

MCU 200 entirely controls base station 20 entirely by executing a program installed therein.

Storage unit 201 is implemented by, e.g. an EEPROM or an electrically rewritable nonvolatile memory such as a flash memory. Storage unit 201 stores, e.g. identification information (for example, an address or a node number) assigned to base station 20, measured data from branch station 10, and communication path information. MCU 200 reads and writes the data in storage unit 201.

Wireless communication unit 202 is composed of a wireless module compliant with the standard of, for example, the specified low power radio communication, and sends and receives wireless signals through antenna 203. Wireless communication unit 202 has a function of measuring the received signal strength indicator of the received signal.

Wired communication unit 204 is connected to, for example, a server through a communication line and sends data collected from branch station 10 to the server by wire.

Operation unit 205 is used, for example, to set an operation of base station 20, and also to set the upper limit of the number of candidate nodes.

Display unit 206 is implemented by, e.g. one or more light emitting diodes turned on and off under control of MCU 200.

Power supply unit 207 is energized by for example, an external power supply, such as a commercial power supply, and supplies power to an internal circuit of base station 20 for its operation.

Figure 14:
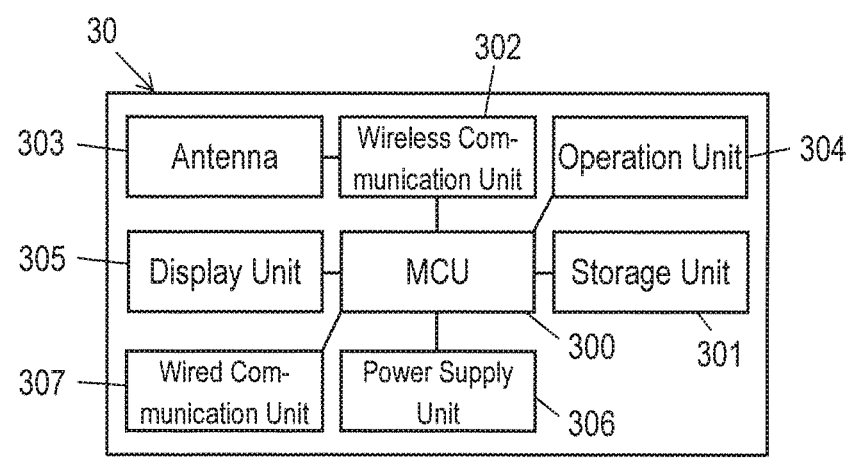
FIG. 14 is a block diagram of a relay station in the wireless communication system according to Embodiment 2.

FIG. 14 is a block diagram of relay station 30. Relay station 30 includes MCU 300, storage unit 301, wireless communication unit 302, antenna 303, operation unit 304, display unit 305, power supply unit 306, and wired communication unit 307. Relay station 30 has a function of relaying wireless communication between branch station 10 and base station 20.

MCU 300 controls entirely relay station 30 by executing a program installed therein.

Storage unit 301 is implemented by, e.g. an EEPROM or an electrically rewritable nonvolatile memory, such as a flash memory. Storage unit 301 stores, e.g. identification information (for example, an address or a node number) assigned to relay station 3, data received and sent by wireless communication unit 302, information about the destination node, information about candidate nodes, and communication path information. MCU 300 reads and writes the data in storage unit 301.

Wireless communication unit 302 is composed of a wireless module compliant with the standard of, for example, the specified low power radio communication, and sends and receives wireless signals through antenna 303. Wireless communication unit 302 also has the function of measuring the received signal strength indicator of the received signal.

Wired communication unit 307 is connected to, for example, a setting device through a communication line so as to perform wired communication.

Operation unit 304 is used, for example, to set an operation of relay station 30 and also to set the limit of the number of candidate nodes. Display unit 305 is implemented by, e.g. one or more light emitting diodes turned on and off under control of MCU 300.

Power supply unit 306 is energized by, for example, a battery to supply power to an internal circuit of relay station 30 for its operation. Since being energized by a battery, relay station 30 can be located anywhere. Alternatively, power supply unit 306 may be energized by an external power supply, such as a commercial power supply, and supplies power to the internal. circuit of relay station 30 for its operation.

Communication procedures of wireless communication system 1002 according to Embodiment 2 will be described below. FIGS. 15 to 21 show the communication procedures of wireless communication system 1002. FIG. 11 also shows a communication procedure of wireless communication system 1002. In FIGS. 15 to 21, like FIG. 11, the numerals in square boxes denoting branch station 10, base station 20, and relay stations 30 represent the node numbers assigned to the respective nodes.

A communication procedure in which branch station 10 as a source node sends data (for example, measured data) to base station 20 as a destination node when a communication path is not established between these stations in wireless communication system 1002 will be described with reference to drawings. Branch station 10, base station 20, and plural relay stations 30 have different node numbers assigned thereto, which will be used in the following description to distinguish each relay station 30. More specifically, in the drawings, relay station 30 with the node number "2" is expressed as relay station 30-2, and branch station 10 with the node number "11" is expressed as branch station 10 with the number "11". In the drawings, arrows represent data transmissions between nodes; solid arrows represent the transmissions of data whereas dotted arrows represent the transmissions of an acknowledgement (hereinafter, "ACK").

A communication procedure in which branch station 10 sends measured data for the first time when a communication path between branch station 10 and base station 20 is not established will be described below. FIG. 11 shows this communication procedure. In wireless communication system 1002, branch station 10 and relay stations 30 send data in broadcast when the destination node has not been determined, and send data in unicast to the destination node after the destination node is determined.

MCU 100 of branch station 10 starts up from a sleep mode every time the predetermined transmission interval elapses and reads measured data to be sent (for example, measured data measured by measurement unit 101 after the previous data transmission) from storage unit 102. MCU 100 stores the measured data and the sequence number, and generates data containing a broadcast address as a destination address (hereinafter, a broadcast number), a source address, and a data source address which is the node number of branch station 10. The sequence number is a number assigned to each data to be sent from branch station 10 to identify the data. MCU 100 then allows wireless communication unit 103 to send the generated data in broadcast (process T101 shown in FIG. 11). In short, branch station 10 sends the generated data in broadcast (process T101 in FIG. 11).

In the example of FIG. 11, three relay stations 30-4, 30-5, and 30-6 with node numbers 4, 5, and 6, respectively are located within a communication area of branch station 10 which can communicate with branch station 10. The data from branch station 10 is received by wireless communication unit 302 of each of relay stations 30-4, 30-5, and 30-6. MCU 300 of each of relay stations 30-4, 30-5, and 30-6 extracts the measured data, the sequence number, the destination address, the source address, and the data source address from the data received by wireless communication unit 302. In wireless communication system 1002, MCU 300 of each relay station 30 has a reply time set individually. The reply time, is the time until each relay station 30 sends an ACK after receiving data. In short, plural relay stations 30 may have reply times different from one another. In the example shown in FIG. 11, relay station 30-4 has a shorter reply time than relay stations 30-5 and 30-6, Therefore, MCU 300 of relay station 30-4 allows wireless communication unit 302 to send an ACK to branch station 10 as the source node when the reply time elapses, earlier than MCU 300 of each of relay stations 30-5 and 30-6 (process T102 shown in FIG. 11). In short, relay station 30-4 sends an ACK to branch station 10 as the source node when the reply time elapses, earlier than relay stations 30-5 and 30-6 (process T102 shown in FIG. 11). Upon receiving the ACK from the upstream node (relay station 30-4) after sending the data, MCU 100 of branch station 10 is switched to the sleep mode when the predetermined time elapses to reduce power consumption. An upstream node of a certain node is a node out of relay stations 30 and base station 20 closer to base station 2 than the certain node in the communication path. The upstream node can be either relay station 30 or base station 20 as the final destination node. A downstream node of a certain node is a node out of relay stations 30 and branch station 10 closer to branch station 10 than the certain node in the communication path. The downstream node can be either relay station 30 or branch station 10 as the source node.

Relay stations 30-5, 30-6 and branch station 10 are located in a communication area of relay station 30-4. The ACK from relay station 30-4 is received by not only branch station 10 but also wireless communication units 302 of relay stations 30-5 and 30-6. MCU 300 of each of relay stations 30-5 and 30-6 determines that relay station 30-4 has sent an ACK in reply to the data from branch station 10, based on, e.g. the data source address or the sequence number contained in the ACK. In short, MCU 300 of each of relay stations 30-5 and 30-6 determines that another relay station 30 has already sent an ACK in reply to the data from branch station 10. As a result, MCU 300 of each of relay stations 30-5 and 30-6 neither sends an ACK to branch station 10 nor relays data. In short, relay station 30 does not send an ACK in reply to broadcast data from another relay station 30 if another relay station 30 has already sent an ACK in reply to the data. Thus, all relay stations 30 received data sent in broadcast, except the first relay station 30 to send an ACK, do not send an ACK, thereby reducing the number of ACKs to be sent and avoiding data collision.

MCU 300 of relay station 30-4 extracts the measured data, the sequence number, the destination address, the source address, and the data source address from the data received from branch station 10. MCU 300 of relay station 30-4 then generates data containing the measured data and the sequence number extracted from the data and having a broadcast number as the destination address, the node number of relay station 30-4 as the source address, and the node number of branch station 10 as the data source address. When await time elapses after receiving the data reception, MCU 300 of relay station 30-4 allows wireless communication unit 302 to send this data in broadcast (process T103 shown in FIG. 11). In short, relay station 30-4 sends this data in broadcast when await time elapses after receiving the data (process T103 shown in FIG. 11).

In the example shown in FIG. 11, relay stations 30-2, 30-3, 30-5, and 30-6 and branch station 10 are located within the communication area of relay station 30-4. The data sent in broadcast from relay station 30-4 is received by wireless communication unit 302 of each of relay stations 30-2, 30-3, 30-5, and 30-6. Branch station 10 does not receive the data from relay station 30-4 since branch station 10 has been in the sleep mode after receiving the ACK in reply to the data sent by branch station 10. The wait time after relay station 30 receives data until relay station 30 relays the received data can be longer than the longest reply times for any relay station 30 to send an ACK (each relay station 30 has a different reply time). With the wait time thus set, even when all relay stations 30 that have received data from branch station 10 send an ACK, the data that is relayed to an upstream node from the relay station 30 which is the first to send the ACK is less likely to collide against the ACKs from the other relay stations 30.

When wireless communication unit 302 of each of relay stations 30-2, 30-3, 30-5, and 30-6 receives data from relay station 30-4, MCU 300 of each of these relay stations 30 extracts the measured data, the sequence number, the destination address, the source address, and the data source address from the received data. As described above, each relay station 30 has an individual reply time until sending an ACK. In the example shown in FIG. 11, relay station 30-3 has a shorter reply time than relay stations 30-2, 30-5, and 30-6. Therefore, MCU 300 of relay station 30-3 allows wireless communication unit 302 to send an ACK to relay station 30-4 as the source node when the reply time elapses, earlier than MCU 300 of each of relay stations 30-2, 30-5, and 30-6 (process T104 shown in FIG. 11).

The ACE from relay station 30-3 to relay station 30-4 is received also by wireless communication unit 302 of each of relay stations 30-2, 30-5, and 30-6. MCU 300 of each of relay stations 30-2, 30-5, and 30-6 neither relays data nor sends an ACK since another relay station (relay station 30-3 in this case) has already sent the ACK in reply to the data from relay station 30-4.

MCU 300 of relay station 30-3 extracts the measured data, the sequence number, the destination address, the source address, and the data source address from the data received from relay station 30-4. MCU 300 of relay station 30-3 then generates data containing the measured data and the sequence number extracted from the data and having a broadcast number as the destination address, the node number of relay station 30-3 as the source address, and the node number of branch station 10 as the data source address. When the wait time elapses after receiving the data, MCU 300 of relay station 30-3 allows wireless communication unit 302 to send this data in broadcast (process T105 shown in FIG. 11). In short, relay station 30-3 sends this data in broadcast when the wait time elapses after receiving the data (process T105 shown in FIG. 11).

In the example shown in FIG. 11, relay stations 30-2, 30-4, and 30-5 are located within the communication area of relay station 30-3 which can communicate with relay station 30-3. The data sent in broadcast from relay station 30-3 is received by wireless communication unit 302 of each of relay stations 30-2, 30-4, and 30-5. In relay stations 30-2, 30-4, and 30-5, when wireless communication unit 302 receives the data from relay station 30-3, MCU 300 extracts the measured data, the sequence number, the destination address, the source address, and the data source address from the received data.

Based on the data source address and the sequence number, MCU 300 of relay station 30-4 determines that the received data is identical to the data previously sent from relay station 30-4, and therefore, does not send an ACK. In each relay station 30 according to Embodiment 2, when wireless communication unit 302 receives data from another node, MCU 300 determines whether the data is previously sent or not based on the data source address and the sequence number contained in the data. MCU 300 of each relay station 30 may alternatively determine whether the data is previously sent or not based on two or more of the data source address, the sequence number, and the data (such as measured data), which are contained in the received data.

When the reply time elapse after receiving the data, MCU 300 of each of relay stations 30-2 and 30-5 allows wireless communication unit 302 to send an ACK to relay station 30-3 as the source node. In the example of FIG. 11, relay station 30-2 has a shorter reply time than relay station 30-5. Therefore, MCU 300 of relay station 30-2 allows wireless communication unit 302 to send an ACK to relay station 30-3 as the source node when the reply time elapses, earlier than MCU 300 of relay station 30-5 (process T106 shown in FIG. 11.). In short, relay station 30-2 sends an ACK to relay station 30-3 as the source node when the reply time elapses, earlier than relay station 30-5 (process T106 shown in FIG. 11). The ACK from relay station 30-2 to relay station 30-3 is also received by relay station 30-5. MCU 300 of relay station 30-5 determines that another relay station (relay station 30-2 in this case) has already sent an ACK in reply to the data received by relay station 30-5, and neither sends an ACK nor relays the data.

MCU 300 of relay station 30-2 generates data containing the measured data and the sequence number extracted from the data and having a broadcast number as the destination address, the node number of relay station 30-2 as the source address, and the node number of branch station 10 as the data source address. When the wait time elapses after receiving the data, MCU 300 of relay station 30-2 allows wireless communication unit 302 to send this data in broadcast (process T107 shown in FIG. 11). In short, relay station 30-2 sends this data in broadcast when the wait time elapses after receiving the data (process T107 shown in FIG. 11).

In the example of FIG. 11, relay stations 30-1 and 30-3 are located in the communication area of relay station 30-2 which can communicate with relay station 30-2. The data sent in broadcast from relay station 30-2 is received by wireless communication unit 302 of each of relay stations 30-1 and 30-3. When wireless communication unit 302 of relay station 30-1 receives the data from relay station 30-2, MCU 300 of relay station 30-1 extracts the measured data, the sequence number, the destination address, the source address, and the data source address from the received data. When the reply time elapses after receiving the data. MCU 300 of relay station 30-1 allows wireless communication unit 302 to send an ACK to relay station 30-2 as the source node (process T108 shown in FIG. 11). Relay station 30-3 also receives the data from relay station 30-2, but determines that the received data is identical to the data previously sent by relay station 30-3, and neither sends an ACK nor relays the data.

MCU 300 of relay station 30-1 extracts the measured data, the sequence number, the destination address, the source address, and the data source address from the data received from relay station 30-2. MCU 300 of relay station 30-1 then generates data containing the measured data and the sequence number extracted from the data and having a broadcast number as the destination address, the node number of relay station 30-1 as the source address, and the node number of branch station 10 as the data source address. When the wait time elapses after receiving the data, MCU 300 of relay station 30-1 allows wireless communication unit 302 to send this data in broadcast (process T109 shown in FIG. 11). In short, relay station 30-1 sends this data in broadcast when the wait time elapses after receiving the data (process T109 shown in FIG. 11).

In the example of FIG. 11, base station 20 is located in the communication area of relay station 30-1 which receives broadcast data from relay station 30-1.

When wireless communication unit 202 of base station 20 receives the data from relay station 30-1, MCU 200 of base station 20 extracts the measured data, the sequence number, the destination address, the source address, and the data source address from the received data. MCU 200 of base station 20 allows storage unit 201 to store the received measured data and the data source address while linking the measured data to the data source address. As a result, base station 20 stores the received measured data and the data source address corresponding to the received measured data.

When receiving the data from relay station 30-1, MCU 200 of base station 20 sends an ACK tagged with final destination information to relay station 30-1 as the source node immediately without having the reply time (process T110 shown, in FIG. 11). The final destination information indicates that branch station 10 can communicate with base station 20, which is the final destination node. According to Embodiment 2, the final destination information shows the number of hops to base station 20. The ACK sent to relay station 30-1 is tagged with the number of hops, "1" to base station 20. Relay stations 30-1 to 30-4 have not yet received the information about the number of hops when they send an ACK in the above-described processes T102, T104, T106, and T108. Therefore, the ACK from relay stations 30-1 to 30-4 is not tagged with the number of hops. In other words, the ACK sent from each relay station 30 in the processes T102, T104, T106, and T108 is tagged with data indicating the number of hops of "0".

When receiving the ACK tagged with the number of hops "1" (final destination information) from base station 20, relay station 30-1 determines that relay station 30-1 can directly communicate with base station 20, which is the destination node. Relay station 30-1 then sets base station 20 as the destination node. After that, relay station 30-1 sends data to base station 20) in unicast.

A communication procedure in which branch station 10 sends measured data for the second time will be described below with reference to FIG. 15. Note that the same communication procedure as performed for the first time described with reference to FIG. 11 will be described briefly. When the transmission interval elapses after sending the last data, branch station 10 starts up from a sleep mode and sends data containing the measured data and the sequence number in broadcast (process T111 shown in FIG. 15).

Figure 15:
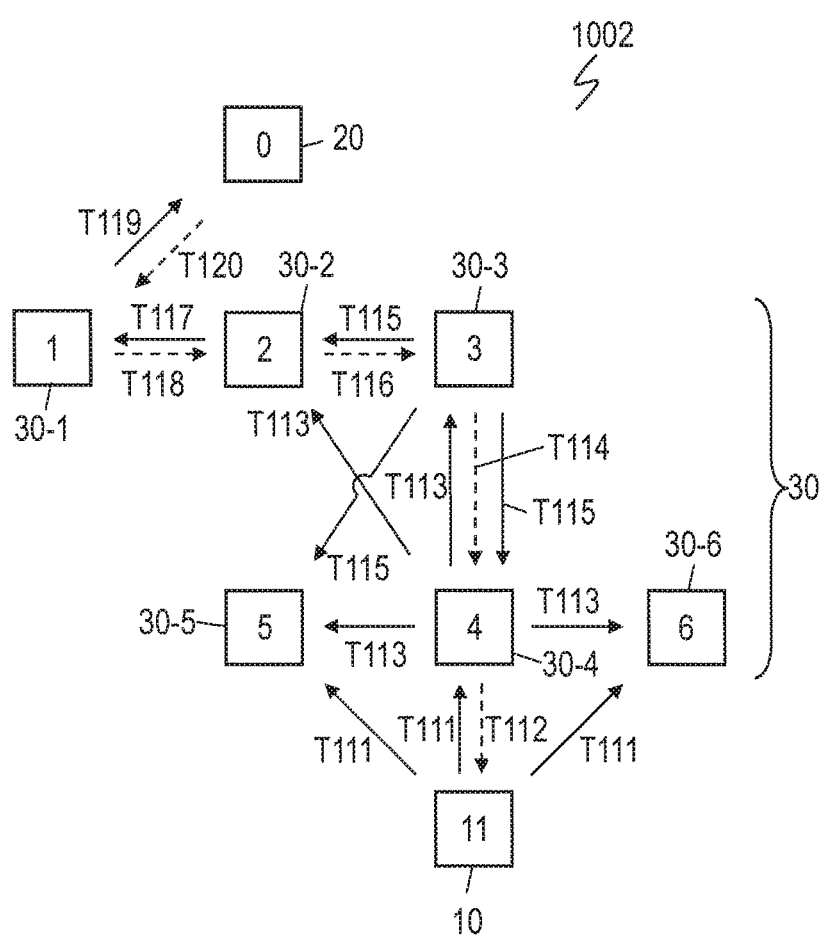
FIG. 15 shows a communication path of the wireless communication system according to Embodiment 2 for illustrating a communication procedure.

In the example shown in FIG. 15, relay stations 30-4, 30-5, and 30-6 receive data from branch station 10. If relay station 30-4 sends an ACK to branch station 10 as the source node before relay stations 30-5 and 30-6 send an ACK (process T112 shown in FIG. 15), branch station 10 receives the ACK and is switched to the sleep mode as to reduce power consumption. The ACK from relay station 30-4 is also received by relay stations 30-5 and 30-6. When receiving the data from branch station 10 and then receiving the ACK from another relay station 30 (relay station 30-4 in this case) in reply to this data, relay stations 30-5 and 30-6 neither send an ACK nor relays the data.

After sending the ACK in reply to the data from branch station 10 before relays stations 30-5 and 30-6 sends an ACK, relay station 30-4 sends the data in broadcast when the wait time elapses after receiving the data (process T113 shown in FIG. 15).

The broadcast data from relay station 30-4 is received by relay stations 30-2, 30-3, 30-5, and 30-6. When the individual reply times elapse, relay stations 30-2, 30-3, 30-5, and 30-6 send an ACK. In the example shown in FIG. 15, relay station 30-3 sends an ACK to relay station 30-4 as the source node before relay stations 30-2, 30-5, and 30-6 send the ACK (process T114 shown in FIG. 15). The ACK is also sent to relay stations 30-2, 30-5, and 30-6. When receiving the ACK, relay stations 30-2, 30-3, and 30-6 neither send an ACK nor relay the data.

After sending the ACK in reply to the data from relay station 30-4 before relay stations 30-2, 30-5 and 30-6 send an ACK, relay station 30-3 sends the data in broadcast when the wait time elapses after receiving the data (process T115 shown in FIG. 15).

In the example shown in FIG. 15, relay stations 30-2, 30-4, and 30-5 are located in the communication area of relay station 30-3. The data sent in broadcast from relay station 30-3 is received by wireless communication unit 302 of each of relay stations 30-2, 30-4, and 30-5. In relay stations 30-2, 30-4, and 30-5, when wireless communication unit 302 receives the data from relay station 30-3, MCU 300 extracts the measured data, the sequence number, the destination address, the source address, and the data source address from the data received by wireless communication unit 302.

Based on the data source address and the sequence number, MCU 300 of relay station 30-4 determines the data from relay station 30-3 to be the data previously sent by relay station 30-4, and neither sends an ACK nor relays the data.

When the reply time elapses after receiving the data, MCU 300 of each of relay stations 30-2 and 30-5 allows wireless communication unit 302 to send an ACK to relay station 30-3 as the source node. In the example shown in FIG. 15, relay station 30-2 has a shorter reply time than relay station 30-5. Therefore, MCU 300 of relay station 30-2 allows wireless communication unit 302 to send an ACK to relay station 30-3 as the source node when the reply time elapses, earlier than MCU 300 of relay station 30-5 (process 1116 shown in FIG. 15). In short, relay station 30-2 sends an ACK to relay station 30-3 as the source node when the reply time elapses, earlier than relay station 30-5 (process T116 in FIG, 15). The ACK from relay station 30-2 to relay station 30-3 is also received by relay station 30-5. MCU 300 of relay station 30-5 determines that another relay station (relay station 30-2 in this case) has already sent an ACK in reply to the data received by relay station 30-5, and neither sends an ACK nor relays the data.

MCU 300 of relay station 30-2 generates data containing the measured data and the sequence number extracted from the data and having a broadcast number as the destination address, the node number of relay station 30-2 as the source address, and the node number "11" of branch station 10 as the data source address. When the wait time elapses after receiving the data, MCU 300 of relay station 30-2 allows wireless communication unit 302 to send this data in broadcast (process T117 shown in FIG. 15). In short, relay station 30-2 sends this data in broadcast when the wait time elapses after receiving the data (process T117 shown in FIG. 15).

The data from relay station 30-2 is received by relay station 30-1, and relay station 30-1 then sends an ACK to relay station 30-2 as the source node (process T118 shown in FIG. 15). Relay station 30-1, which holds the information about the number of hops (final destination information), sends Ia an ACK to relay station 30-2 as the source node. This ACK is tagged with the information about the number of hops corresponding to the next node, or in other words, the number of hops "2" obtained by adding "1" to the number of hops "1". When acquiring the information about the number of hops (final destination information) tagged to the ACK sent from relay station 30-1, relay station 30-2 holds "2" as the number of hops from relay station 30-2 to base station 20. Relay station 30-2 sets relay station 30-1 as the destination node, and then, sends all data to relay station 30-1 in unicast. Relay station 30-3 also receives data from relay station 30-2, but determines the received data to be the data previously sent from relay station 30-3, and neither sends an ACK nor relays the data.

After sending the ACK in reply to the data from relay station 30-2 before relay station 30-3 sends an ACK, relay station 30-1 sends the data in unicast to base station 20 when the wait time elapses after receiving the data (process T119 shown in FIG. 15).

When receiving the data in unicast from relay station 30-1, base station 20 sends an ACK tagged with the information about the number of hops "1" (final destination information) to relay station 30-1 as the source node immediately without having the reply time (process T120 in FIG. 15).

After the data is sent for the second time from branch station 10 to base station 20 via relay stations 30-4, 30-3, 30-2, and 30-1 as described above, the information about the number of hops (final destination information) is transferred from relay station 30-1 to relay station 30-2. Based on this information, relay station 30-2 sets relay station 30-1 as the destination node. In subsequent communications, relay stations 30-1 and 30-2 send data in unicast to the destination nodes, namely, to base station 2 and to relay station 30-1, respectively. In short, relay station 30-1 sends data in unicast to base station 2 as the destination node, whereas relay station 30-2 sends data in unicast to relay station 30-1 as the destination node.

A communication procedure in which branch station 10 sends measured data for the third time will be described below with reference to FIG. 16. Note that the same communication procedure performed for the first and second times described above will be described briefly.

Figure 16:
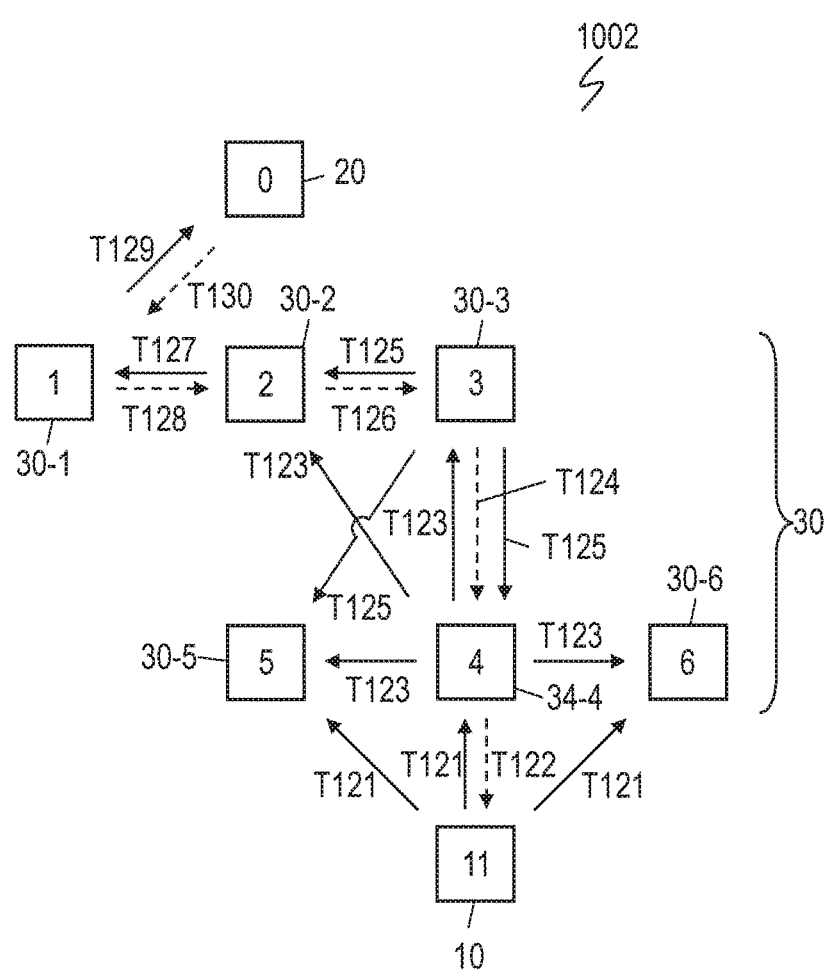
FIG. 16 shows a communication path of the wireless communication system according to Embodiment 2 for illustrating a communication procedure.

When the transmission interval elapses after sending the last data, branch station 10 starts up from the sleep mode and sends data containing the measured data and the sequence number in broadcast (process T121 in FIG. 16).

In the example shown in FIG. 16, relay stations 30-4, 30-5, and 30-6 receive the data from branch station 10. If relay station 30-4 sends an ACK to branch station 10 as the source node before relay stations 30-5 and 30-6 send an ACK (process T122 shown in FIG. 16), branch station 10 is switched to the sleep mode when receiving the ACK so as to reduce power consumption. The ACK from relay station 30-4 is also received by relay stations 30-5 and 30-6. When receiving the data from branch station 10 and then receiving the ACK from another relay station 30 (relay station 30-4 in this case) in reply to this data, relay stations 30-5 and 30-6 neither send an ACK nor relays the data.

After sending the ACK in reply to the data from branch station 10 before relay stations 30-5 and 30-6 send the ACK, relay station 30-4 sends the data in broadcast when the wait time elapses after receiving the data (process T123 shown in FIG. 16).

The data sent in broadcast from relay station 30-4 is received by relay stations 30-2, 30-3, 30-5, and 30-6. When their individual reply times elapses, relay stations 30-2, 30-3, 30-5, and 30-6 send an ACK. In the example shown in FIG. 16, relay station 30-3 sends an ACK to relay station 30-4 as the source node before relay stations 30-2, 30-5, and 30-6 send an ACK (process T124 shown in FIG. 16). The ACK sent from relay station 30-3 is also sent to relay stations 30-2, 30-5, and 30-6. When receiving the ACK. sent from relay station 30-3, relay stations 30-2, 30-5, and 30-6 neither send an ACK nor relays the data.

After sending the ACK in reply to the data from relay station 30-4 before relay stations 30-2, 30-5 and 30-6 send the ACK, relay station 30-3 sends the data in broadcast when the wait time elapses after receiving the data (process T125 shown in FIG. 16).

In the example shown in FIG. 16, relay stations 30-2, 30-4, and 30-5 are located in the communication area of relay station 30-3. The data sent in broadcast from relay station 30-3 is received by wireless communication unit 302 of each of relay stations 30-2, 30-4, and 30-5. In relay stations 30-2, 30-4, and 30-5, when wireless communication unit 302 receives the data from relay station 30-3, MCU 300 extracts the measured data, the sequence number, the destination address, the source address, and the data source address from the data received by wireless communication unit 302.

Based on the data source address and the sequence number, MCU 300 of relay station 30-4 determines that the data from relay station 30-3 is the data previously sent from relay station 30-4, and neither sends an ACK nor relays the data. Thus, one relay station (for example, relay station 30-4) out of one or more relay stations 30 does not send an ACK in reply to the data received in broadcast by relay station 30-4 if another relay station out of the one or more relay stations 30 has already sent an ACK for the data.

When the respective reply times elapses after receiving the data, MCU 300 of each of relay stations 30-2 and 30-5 allows wireless communication unit 302 to send an ACK to relay station 30-3 as the source node. In the example shown in FIG. 16, relay station 30-2 has a shorter reply time than relay station 30-5. Therefore, MCU 300 of relay station 30-2 allows wireless communication unit 302 to send an ACK to relay station 30-3 as the source node when the reply time elapses, earlier than MCU 300 of relay station 30-5 (process T126 shown in FIG. 16). In short, relay station 30-2 sends an ACK to relay station 30-3 as the source node when the reply time elapses, earlier than relay station 30-5 (process T126 shown in FIG. 16). Relay station 30-2 which holds the information about the number of hops (final destination information) sends an ACK to relay station 30-3 as the source node. This ACK is tagged with the information about the number of hops corresponding to the next node, or in other words, the information about the number of hops "3" (final destination information) obtained by adding "1" to the number of hops "2" of relay station 30-2). When acquiring the information about the number of hops (final destination information) tagged to the ACK sent from relay station 30-2, relay station 30-3 holds the number of hops "3" from relay station 30-3 to base station 20. Relay station 30-3 sets relay station 30-2 as the destination node, and hereafter sends all data to relay station 30-2 in unicast.

The ACK sent from relay station 30-2 to relay station 30-3 is also received by relay station 30-5. MCU 300 of relay station 30-5 determines that the ACK in reply to the data received by relay station 30-5 is sent from another relay station (in this case, relay station 30-2), and neither sends an ACK nor relays the data.

After sending the ACK in reply to the data from relay station 30-3 before other relay stations send the ACK, relay station 30-2 sends the data in unicast to relay station 30-1 when the wait time elapses after receiving the data (process T127 shown in FIG. 16).

When receiving the data in unicast from relay station 30-2, relay station 30-1 sends relay station 30-2 as the source node an ACK tagged with information about the number of hops (final destination information) (process T128 shown in FIG. 16).

When the wait time elapses after receiving the data, relay station 30-1 sends data in unicast to base station 20 (process T129 shown in FIG. 16).

When receiving the data in unicast from relay station 30-1, base station 20 sends an ACK tagged with the information about the number of hops (final destination information) to relay station 30-1 as the source node immediately without the reply time (process T130 in FIG. 16).

After the data is sent for the third time from branch station 10 to base station 20 via relay stations 30-4, 30-3, 30-2, and 30-1 in this order, as described above, the information about the number of hops (final destination information) is transferred from relay station 30-2 to relay station 30-3. Based on this information, relay station 30-3 sets relay station 30-2 as the destination node. In subsequent communications, relay stations 30-1 to 30-3 send data in unicast to the corresponding destination nodes. More specifically, in subsequent communications, relay station 30-1 sends data in unicast to base station 20 as the destination node, relay station 30-2 sends data in unicast to relay station 30-1 as the destination node, and relay station 30-3 sends data in unicast to relay station 30-2 as the destination to node.

A communication procedure in which branch station 10 sends measured data for the fourth time will be described below with reference to FIG. 17. Note that the same communication procedure as performed for the first to third times described above will be described briefly.

Figure 17:
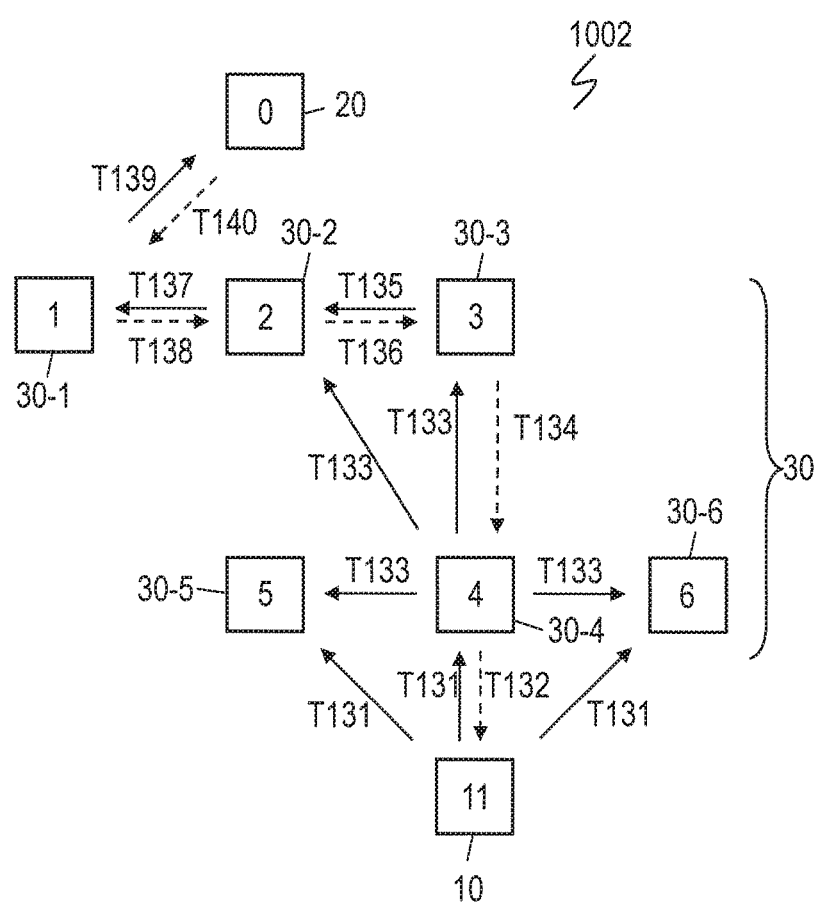
FIG. 17 shows a communication path of the wireless communication system according to Embodiment 2 for illustrating a communication procedure.

When the transmission interval elapses after sending the last data, branch station 10 starts up from the sleep mode and sends data containing the measured data and the sequence number in broadcast (process T131 shown in FIG. 17).

In the example shown in FIG. 16, relay stations 30-4, 30-5, arid 30-6 receive data from branch station 10. If relay station 30-4 sends an ACK to branch station 10 as the source node before relay stations 30-5 and 30-6 send an ACK (process T132 shown in FIG. 17), branch station 10 is switched to the sleep mode when receiving the ACK as to reduce power consumption. The ACK from relay station 30-4 is also received by relay stations 30-5 and 30-6. When receiving the data from branch station 10 and then receiving the ACK from another relay station 30 (relay station 30-4 in this case) in reply to this data, relay stations 30-5 and 30-6 neither send an ACK, nor relays the data.

After sending the ACK in reply to the data from branch station 10 before relay stations 30-5 and 30-6 send the ACK, relay station 30-4 sends the data in broadcast when the wait time elapses after receiving the data (process T133 shown in FIG. 17).

The data sent in broadcast from relay station 30-4 is received by relay stations 30-2, 30-3, 30-5, and 30-6. When their individual reply times elapse, relay stations 30-2, 30-3, 30-5, and 30-6 send an ACK. In the example shown FIG. 17, relay station 30-3 sends an ACK to relay station 30-4 as the source node before relay stations 30-2, 30-5, and 30-6 send an ACK (process T134 shown in FIG. 17). Relay station 30-3 which holds the information about the number of hops (final destination information) sends an ACK to relay station 30-4 as the source node. This ACK is tagged with the information about the number of hops corresponding to the next node, in other words, the information about the number of hops "4" (final destination information) obtained by adding "1" to the number of hops "3" of relay station 30-3. When acquiring the information about the number of hops tagged to the ACK sent from relay station 30-3, relay station 30-4 holds "4" as the number of hops from relay station 30-4 to base station 20. Relay station 30-4 sets relay station 30-3 as the destination node, and hereinafter, sends all data to relay station 30-3 in unicast.

The ACK from relay station 30-3 is also sent to relay stations 30-2, 30-5, and 30-6. When receiving the ACK, relay stations 30-2, 30-5, and 30-6 neither send an ACK nor relay the data.

After sending the ACK in reply to the data from relay station 30-4 before other relay stations send an ACK, relay station 30-3 sends the data in unicast to relay station 30-2 as the destination node when the wait time elapses after receiving the data (process T135 shown in FIG. 17).

After receiving the data in unicast from relay station 30-3, relay station 30-2 sends relay station 30-3 as the source node an ACK tagged with information about the number of hops (final destination information) when the reply time elapses (process T136 shown in FIG. 17).

When the wait time elapses after receiving the data, relay station 30-2 sends data in unicast to relay station 30-1 (process T137 shown in FIG. 17).

After receiving the data in unicast from relay station 30-2, relay station 30-1 sends relay station 30-2 as the source node an ACK tagged with information about the number of hops (final destination information) when the reply time elapses (process T138 shown in FIG. 17).

When the wait time elapses after receiving the data, relay station 30-1 sends data in unicast to base station 20 (process T139 shown in FIG. 17).

When receiving the data in unicast from relay station 30-1, base station 20 sends an ACK. tagged with the information about the number of hops (final destination information.) to relay station 30-1 as the source node immediately without the reply time (process T140 shown in FIG. 17).

After the data is sent for the fourth time from branch station 10 to base station 20 via relay stations 30-4, 30-3, 30-2, and 30-1 in this order, as described above, the information about the number of hops (final destination information) is transferred from relay station 30-3 to relay station 30-4. Based on this information, relay station 30-4 sets relay station 30-3 as the destination node. In subsequent communications, relay stations 30-1 to 30-4 send data in unicast to the corresponding destination nodes. More specifically, relay station 30-1 sends data in unicast to base station 20 as the destination node, relay station 30-2 sends data in unicast to relay station 30-1 as the destination node, relay station 30-3 sends data in unicast to relay station 30-2 as the destination node, and relay station 30-4 sends data in unicast to relay station 30-3 as the destination node.

After this, when the transmission interval elapses after sending the last data and then branch station 10 send data in broadcast, relay station 30-4 sends branch station 10 an ACK tagged with the information about the number of hops. As a result, branch station 10 sets relay station 30-4 as the destination node, and hereafter sends all data to relay station 30-4 in unicast.

Figure 18:
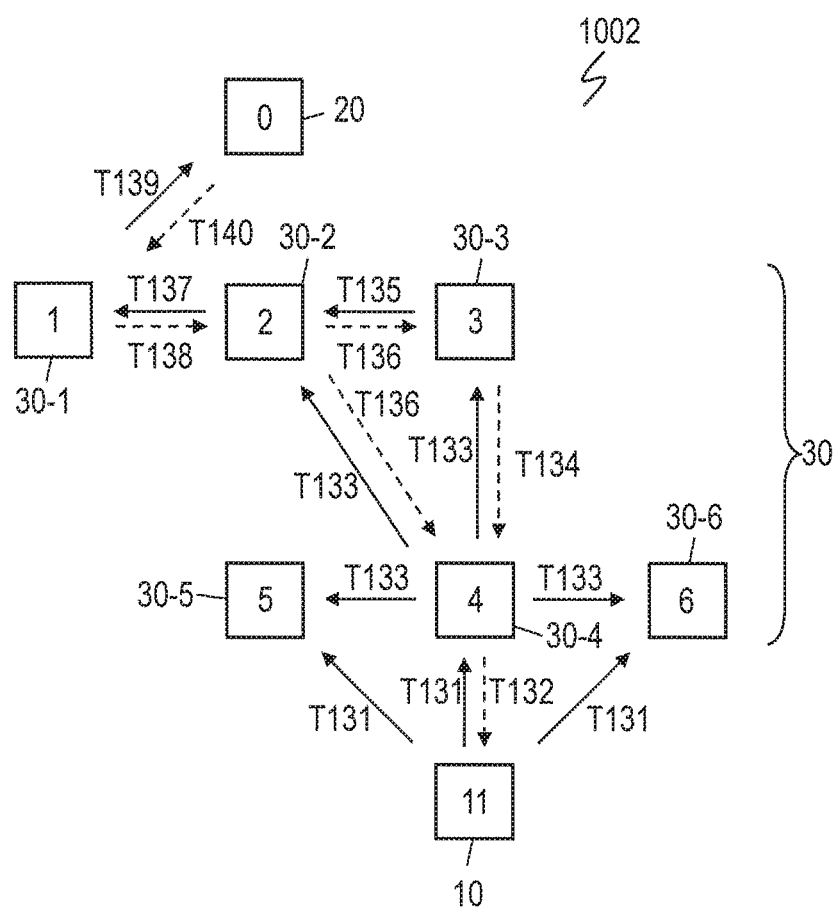
FIG. 18 shows a communication path of the wireless communication system according to Embodiment 2 for illustrating a communication procedure.

According to Embodiment 2, thus, if a certain relay station 30 determines the destination node and then determines another relay station 30 holding a smaller number of hops, based on the information about the number of hops tagged to the ACK sent to the another relay station 30, the certain relay station 30 changes the destination ode to the another relay station 30. This operation of relay station 30 will be described below with reference to FIG. 18. In FIG. 18, data transmissions identical to those shown in FIG. 17 are denoted by the same reference numerals.

In the data transmission for the fourth time from branch station 10 to base station 20 described with reference to FIG. 17, if relay station 30-3 sends data to relay station 30-2 (process T135), relay station 30-2 sends an ACK to relay station 30-3 as the source node (process T136). As shown in FIG. 18, when relay station 30-4 receives the ACK from relay station 30-2, MCU 300 of relay station 30-4 determines whether or not this ACK is in reply to the data previously sent from relay station 30-4. When determining that the ACK is sent in reply to the data previously sent from relay station 30-4, MCU 300 of relay station 30-4 determines whether or not this ACK is tagged with the information about the number of hops (final destination information). When the ACK (second ACK) from relay station 30-2 is tagged with the information about the number of hops, MCU 300 of relay station 30-4 calculates, based on the number of hops "3", the second number of hops "3" corresponding to the case that the destination node is set to relay station 30-2 (second upstream node). MCU 300 of relay station 30-4 previously sets relay station 30-3 as the destination node in the previous communication (process T134) based on the number of hops tagged to the ACK (first ACK) received from relay station 30-3. MCU 300 of relay station 30-4 previously calculates the first number of hops "4" corresponding to the case that the destination node is set to relay station 30-3 (first upstream node) based on the information about the number of hops tagged to the first ACK received from relay station 30-3. MCU 300 of relay station 30-4 compares the first number of hops "4" corresponding to the case that the destination node is set to relay station 30-3 with the second number of hops "3" corresponding to the case that it is set to relay station 30-2. The number of hops in the case that the destination node is set to relay station 30-2 is smaller than the number of hops in the case that it is set to relay station 30-3. Therefore, MCU 300 of relay station 30-4 changes the destination node from relay station 30-3 to relay station 30-2, and then, stores relay station 30-3 which is the previous destination node to storage unit 301 as a candidate destination node. When the number of hops is larger in the case that the destination node is set to relay station 30-2 than in the case that the destination node is set to relay station 30-3, MCU 300 of relay station 30-3 maintains relay station 30-3 as the destination node.

Figure 19:
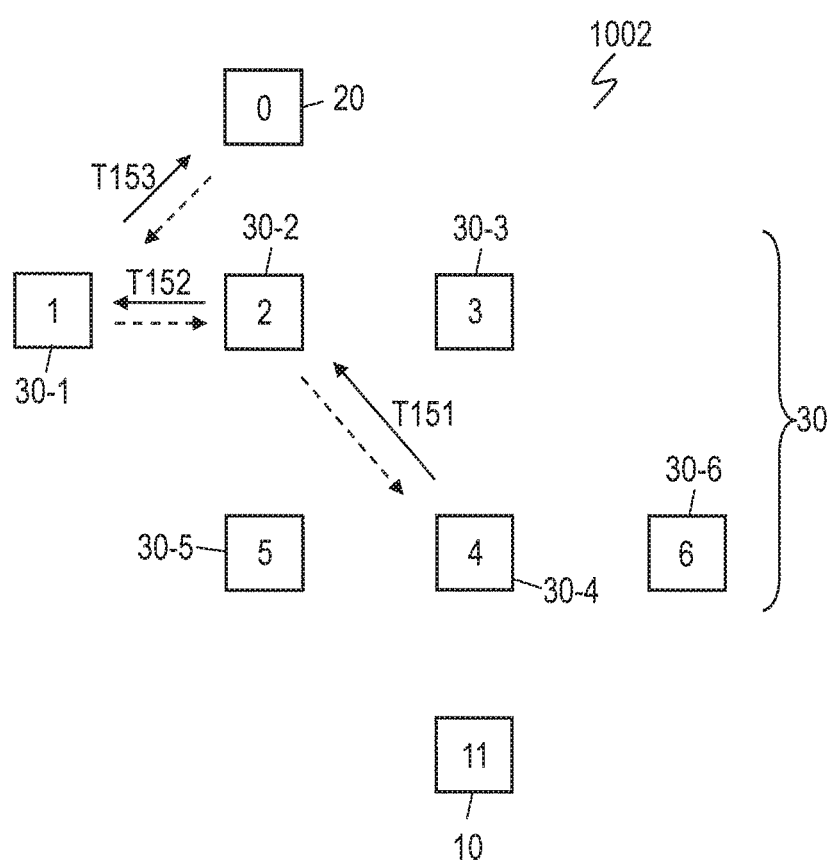
FIG. 19 shows a communication path of the wireless communication system according to Embodiment 2 for illustrating a communication procedure.

After MCU 300 of relay station 30-4 thus changes the destination ode to relay station 30-2, relay station 30-4 sends data in unicast to relay station 30-2, as shown in FIG. 19 in the next data transmission (process T151 shown in FIG. 19). Relay station 30-2 sends data in unicast to relay station 30-1 (process T152 shown in FIG. 19), and then, relay station 30-1 sends data in unicast to base station 20 (process T153 in FIG. 19).

In the example shown in FIG. 18, relay station 30-4 once sets the destination node to relay station 30-3 before determining the destination node, and then. changes the destination node to relay station 30-2. Alternatively, the same process may be performed after the destination node is determined.

A communication procedure in which a communication path from branch station 10 to base station 20 is established via relay stations 30-4, 30-3, 30-2, and 30-1 in this order from branch station 10 will be described below with reference to FIG. 20.

Figure 20:
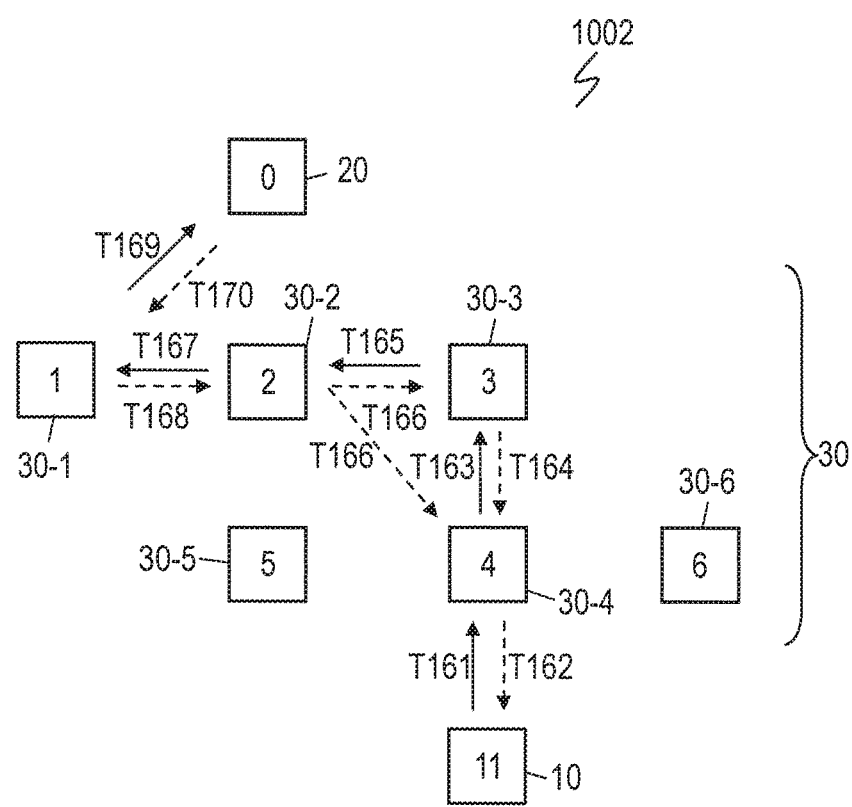
FIG. 20 shows a communication path of the wireless communication system according to Embodiment 2 for illustrating a communication procedure.

After the above communication path is established, when the transmission interval elapses after sending the last data, branch station 10 starts up from the sleep mode and sends data in unicast to relay station 30-4 (process T161 shown in FIG. 20).

When receiving the data from branch station 10, relay station 30-4 sends an ACK tagged with the information about the number of hops (final destination information) to branch station 10 (process T162 shown in FIG. 20). When receiving the ACK after sending the data, branch station 10 is switched back to the sleep mode to reduce power consumption.

When the wait time elapses after receiving the data, relay station 30-4 sends data in unicast to relay station 30-3 as the destination node (process T163 in FIG. 20).

When receiving the data from relay station 30-4, relay station 30-3 sends an ACK tagged with the information about the number of hops (final destination information) to relay station 30-4 (process T164 shown in FIG. 20). When the wait time elapses after receiving the data, relay station 30-3 sends data in unicast to relay station 30-2 as the destination node (process T165 shown in FIG. 20).

When receiving the data from relay station 30-3, relay station 30-2 sends an ACK tagged with the information about the number of hops (final destination information) to relay station 30-3 (process T166 shown in FIG. 20). When the wait time elapses after receiving the data, relay station 30-2 sends data in unicast to relay station 30-1 as the destination node (process T167 shown in FIG. 20).

When receiving the data from relay station 30-2, relay station 30-1 sends an ACK tagged with the information about the number of hops (final destination information) to relay station 30-2 (process T168 in FIG. 20). When the wait time elapses after receiving the data, relay station 30-1 sends data in unicast to base station 20 as the destination node (process T169 in FIG. 20).

When receiving the data from relay station 30-1, base station 20 sends an ACK to relay station 30-1 as the source node (process T170 shown in FIG. 20). This completes one data transmission from branch station 10 to base station 20.

A communication procedure in which the ACK sent. from relay station 30-2 in process T166 is received by relay station 30-4 will be described. In relay station 30-4, when wireless communication unit 302 receives the ACK from relay station 30-2, MCU 300 determines whether or not the ACK is sent in reply to the data previously sent from relay station 30-4, based on the data source address and the sequence number contained in the ACK. If the ACK from relay station 30-2 is determined to be sent in reply to the data previously sent from relay station 30-4, MCU 300 of relay station 30-4 determines whether or not this ACK is tagged with the information about the number of hops (final destination information). When this ACK is determined to be added with the information about the number of hops, MCU 300 of relay station 30-4 calculates the number of hops "3" (the second number of hops) from the information about the number of hops "3" tagged to the ACK corresponding to the case that the destination node is set to relay station 30-2 (the second upstream node). In the established communication path, relay station 30-4 determines relay station 30-3 (the first upstream node) to be the destination node, and the number of hops (the first number of hops) in this case is "4". Relay station 30-4 compares the number of hops (the first number of hops) "4" corresponding to the case that the destination node is set to relay station 30-3 with the number of hops the second number of hops) "3" corresponding to the case that it is set to relay station 30-2. The number of hops in the case that the destination node is set to relay station 30-2 is smaller than the number of hops in the case that it is set to relay station 30-3. Therefore, MCU 300 of relay station 30-4 changes the destination node from relay station 30-3 to relay station 30-2, and then, stores relay station 30-3 which is the previous destination node to storage unit 301 as a candidate destination node. When the number of hops is larger in the case that the destination node is set to relay station 30-2 than in the case that the destination node is set to relay station 30-3, MCU 300 of relay station 30-4 maintains relay station 30-3 to be the destination node.

Storage unit 301 may store plural candidate nodes. When relay station 30-4 receives an ACK containing a smaller number of hops than the number of hops corresponding to the case that the destination node is set to relay station 30-2, relay station 30-4 determines relay station 30 which sends the ACK as the destination node, and sends data in unicast to relay station 30. Storage unit 301 of relay station 30-4 stores relay station 30-2 as a candidate node in addition to relay station 30-3.

After the destination node is changed from relay station 30-3 to relay station 30-2, if data is not successfully sent in unicast to relay station 30-2, relay station 30-4 sends the data again to the same destination node. If the data is not successfully sent in unicast again to relay station 30-2, relay station 30-4 as a downstream node sends the data to relay station 30-3 which is a candidate node stored in storage unit 301. If the data is not successfully sent in unicast to relay station 30-3, relay station 30-4 sends the data again to the same destination node. If relay station 30-4 fails to resend the data to relay station 30-3, or in other words, to relay stations 30-2 and 30-3 which are all of the candidate nodes, relay station 30-4 sends the data in broadcast to re-establish a communication path.

A communication procedure in the subsequent data transmission will be described below with reference to FIG. 21. When the transmission interval elapses after sending the last data, branch station 10 starts up from a sleep mode and sends data in unicast to relay station 30-4 (process T171 shown in FIG. 21).

Figure 21:
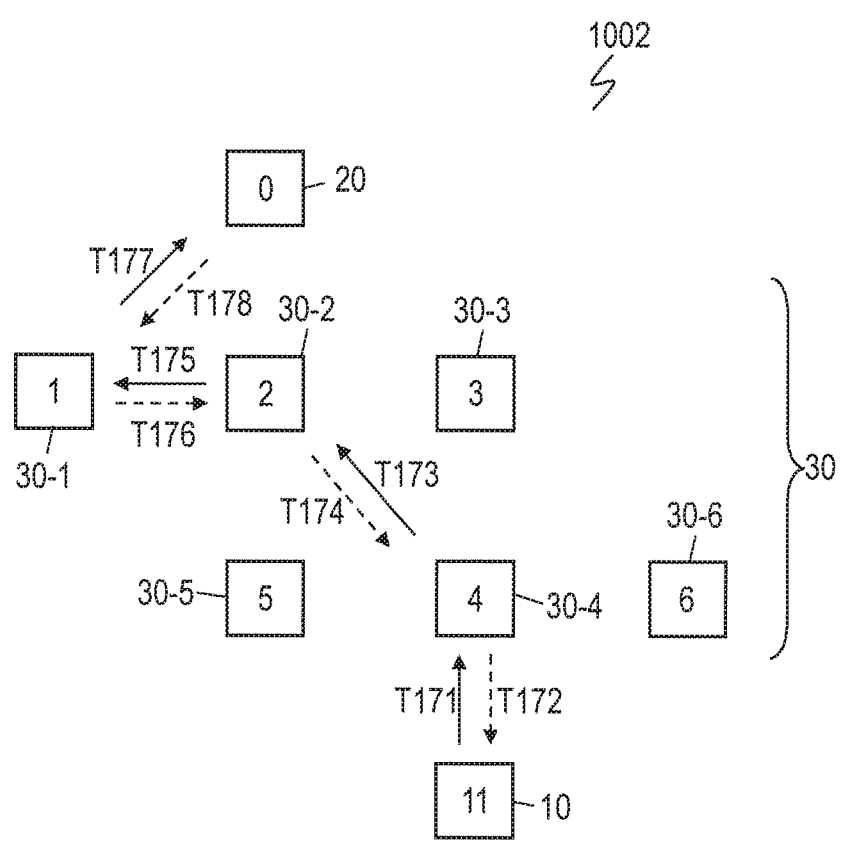
FIG. 21 shows a communication path of the wireless communication system according to Embodiment 2 for illustrating a communication procedure.

When receiving the data from branch station 10, relay station 30-4 sends branch station 10 an ACK tagged with the information about the number of hops "4" corresponding to the next node obtained by adding "1" to the number of hops "3" of relay station 30-4 (process T172 shown in FIG. 21). When receiving the ACK in reply to the data sent from branch station 10, branch station 10 is switched back to the sleep mode to reduce power consumption. When the wait time elapses after receiving the data, relay station 30-4 sends data in unicast to relay station 30-2 as the destination node (process T173 shown in FIG. 21).

When receiving data from relay station 30-4, relay station 30-2 sends relay station 30-4 an ACK tagged with the information about the number of hops (final destination information) (process T174 shown in FIG. 21). When the wait time elapses after receiving the data, relay station 30-2 sends data in unicast to relay station 30-1 as the destination node (process T175 in FIG. 21).

When receiving data from relay station 30-2, relay station 30-1 sends relay station 30-2 an ACK tagged with the information about the number of hops (final destination information) (process T176 shown in FIG. 21). When the wait time elapses after receiving the data, relay station 30-1 sends data in unicast to base station 20 as the destination node (process T177 shown in FIG. 21).

When receiving the data from relay station 30-1, base station 20 sends an ACK to relay station 30-1 as the source node (process T178 shown in FIG. 21). This completes one data transmission from branch station 10 to base station 20. The number of hops is reduced by relay station 30-4 changing the destination node from relay station 30-3 to relay station 30-2. This operation reduces the number of communications between nodes to send data from branch station 10 as the source node to base station 20 as the final destination node, thereby avoiding data collision.

In the network system disclosed in PTL 1, the request packet sent in broadcast from the base station node to a specific branch node is relayed by nodes, thereby establishing a communication path between the base station node and the destination branch node. Therefore, the firstly-established communication path to the destination branch node may be continued to be used even when there is another communication path with a smaller number of hops.

In wireless communication system 1002 according to Embodiment 2, downstream nodes receive an ACK sent to other nodes, as described above. After receiving the second ACK sent from the second upstream node to another node and then determining that the second upstream node provides a smaller number of hops than the first upstream node, a downstream node sets the second upstream node as the destination node. Thus, downstream nodes can thus determine the destination node as to have a smaller number of hops. This reduces the number of communications between nodes to send data from branch station 10 as the source node to base station 20 as the final destination node, thereby avoiding data collision.

According to Embodiment 2, branch station 10 is switched back to the sleep mode to save the battery when receiving an ACK in reply to the data sent from branch station 10. Branch station 10, however, does not necessarily to be switched back to the sleep mode if supplied power from an external power supply. In that case, branch station 10 can receive an ACK sent from the second upstream node to another node, and then, can calculate the second number of hops from the number of hops tagged to this ACK, similarly to relay station 30. In that case, branch station 10 may compare the second number of hops with the first number of hops corresponding to the case that the destination node is set to the first upstream node. If the second, number of hops is smaller than the first number of hops, the destination node may be changed from the first upstream node to the second upstream node.

As described above, in wireless communication system 1002 according to Embodiment 2, while a communication path is not established to send. data from branch station 10 to base station 20, branch station 10 and each of relay stations 30 send data in broadcast. After a node (branch station 10 and relay station 30) determines the destination node in at least a part of the communication path, the node sends data in unicast to the determined destination node. If receiving a first ACK from a first downstream node, a downstream node (branch station 10 or relay station 30) in the communication path calculates the first number of hops based on the number of hops tagged to the first ACK. If receiving a second ACK sent from the second upstream node to another node after receiving the first ACK, the downstream node calculates the second number of hops based on the number of hops tagged to the second ACK. If the second number of hops is smaller than the first number of hops, the downstream node may set the second upstream node as the destination node so as to reduce the number of hops. This reduces the number of communications to relay data from branch station 10 to base station 20, thereby avoiding data collision.

According to Embodiment 2, base station 20 can send the source node an ACK tagged with the number of hops corresponding to the next node in reply to the data received by base station 20. When receiving an ACK tagged with the number of hops from an upstream node, relay station 30 can calculate the number of hops corresponding to the next node from the number of hops tagged to the ACK. Relay station 30 can then send to the source node an ACK tagged with the number of hops corresponding to the next node in reply to the data next received. Thus, the information about the number of hops is transferred from one downstream node to another downstream node at every communication between branch station 10 and base station 20. Therefore, it is not necessary to previously set the information about the number of hops in each relay station 30.

According to Embodiment 2, if the second number of hops becomes smaller than the first number of hops after a downstream node sets the first upstream node as the destination node when the downstream node has not determined the destination node, the destination node can be changed to the second upstream node. Thus, downstream nodes can determine the destination node as to have a smaller number of hops. This reduces the number of communications to relay data from branch station 10 to base station 20, thereby avoiding data collision.

According to Embodiment 2, if the second number of hops calculated based on the second ACK is smaller than the first number of hops after a downstream node sets the first upstream node as the destination node, the downstream node can change the destination node to the second upstream node. Thus, downstream nodes can determine the destination node as to have a smaller number of hops. This reduces the number of communications to relay data from branch station 10 to base station 20, thereby avoiding data collision.

In wireless communication system 1002, when changing the destination node from the first upstream node to the second upstream node, downstream nodes (branch station 10 and relay stations 30) may store the first upstream node in a memory (storage units 102 and 301) as a candidate node for the destination node. The downstream nodes can communicate with the first upstream node stored in the memory as a candidate node. This allows the downstream nodes to communicate the first upstream node as a candidate node when failing to communicate with the second upstream node, thereby avoiding communication failure between branch station 10 and base station 20.

According to Embodiment 2, if failing to send data to the destination node after determining the destination node, a downstream node may resend the data in unicast to the destination node. If failing to resend the data to the destination node, the downstream node may send the data in unicast to a candidate node stored in the memory. If failing to send the data to all the stored candidate nodes, the downstream node may send the data in broadcast to re-establish a communication path. Thus, if failing to send data to the destination node, the downstream node first tries to send data in unicast to each of the destination node and the candidate nodes, and then, tries to send data in broadcast, thereby avoiding data transmission failure. When plural candidate nodes are stored, the downstream node can send data in unicast, for example, in descending order of the number of hops held by the candidate nodes, or in ascending order of the received signal strength indicator exhibited by the candidate nodes.

According to Embodiment 2, relay station 30 does not send an ACK in reply to data received in broadcast from another node if base station 20 has already send an ACK in reply to the same data for the following reason. When the another node can communicate with base station 20, this node can minimize the number of hops by setting base station 20 as the destination node, hence allowing relay station 30 not to send an ACK. This avoids data collision and reduces data loss.

After a communication path is established from branch station 10 to base station 20, branch station 10 and relay station 30 can send the upstream node data with identification information (for example, node number) assigned to each node.

When receiving an ACK tagged with the number of hops, branch station 10 sets relay station 30 that sent this ACK as the destination node, and determines that a communication path to base station 20 has been established. When branch station 10 sends data to an upstream node next time, the data is tagged with the identification information about branch station 10 and a command informing relay station 30 of the communication path. When receiving this data, relay station 30 sends the upstream node data tagged with identification information of relay station 30 according to the command tagged to the received data. Consequently, the data received by base station 20 is tagged with the respective identification information of all the nodes constituting the communication path from branch station 10 to base station 20. This allows base station 20 to hold the communication path from branch station 10 to base station 20.

INDUSTRIAL APPLICABILITY

A wireless communication system according to the present invention avoids data collision during establishing a communication path, and is useful for a wireless communication system including nodes located inside and outside communication areas thereof.

REFERENCE MARKS IN DRAWINGS

1 ranch station (first node)
2 base station (second node)
3,3a to 3f relay station (third node)
10 branch station (first node)
20 base station (second node, downstream node)
30,30-1 to 30-6 relay station (third node, downstream node)

The invention claimed is:

1. A wireless communication system comprising:
a measurement unit that measures a physical quantity and creates measured data based on the measured physical quantity;
a first node having a wireless communication function;
a second node having a wireless communication function; and
one or more third nodes configured to relay wireless communication between the first node and the second node,
wherein, while a communication path through which the measured data is sent from the first node to the second node is not established, the first node and the one or more third nodes send the measured data in broadcast,
wherein, after determining a destination in at least a part of the communication path from the first node to the second node, a node out of the first node and the one or more third nodes which has the determined destination sends the measured data to the determined destination in unicast,
wherein, when each node of the first node and the one or more third nodes cannot send the measured data to an upstream node in the communication path after the communication path is established, the each node performs resending of the measured data in unicast to the upstream node, and
wherein, if the resending fails, each of the first node and the one or more third nodes sends the measured data in broadcast to re-establish a new communication path to the second node.

2. The wireless communication system of claim 1, wherein a final destination to which the first node sends the measured data is the second node,
wherein upon receiving the measured data, each of the second node and the one or more third nodes replies an acknowledgment (ACK), and
wherein, upon receiving the measured data, the second node replies the ACK tagged with final destination information indicating that the second node as the final destination receives the measured data.

3. The wireless communication system of claim 2, wherein, upon receiving the ACK tagged with the final destination information from a certain upstream node in the communication path and then receiving next data from a downstream node in the communication path, the one or more third nodes send the ACK tagged with the final destination information to the downstream node.

4. The wireless communication system of claim 2, wherein, upon receiving the measured data from the first node, the second node traces the communication path along which the measured data is sent and sends the final destination information to a third node out of the one or more third nodes that directly communicates with the first node.

5. The wireless communication system of claim 1, wherein each of the one or more third nodes has a longer reply duration from receiving the measured data to sending an acknowledgement (ACK) upon receiving the measured data in broadcast than upon receiving the measured data in unicast.

6. The wireless communication system of claim 1, wherein the second node has a shorter reply duration from receiving the measured data in broadcast to sending an acknowledgement (ACK) than the one or more third nodes.

7. The wireless communication system of claim 1, wherein the physical quantity is an ambient physical quantity.

8. The wireless communication system of claim 1, wherein, when an acknowledgement (ACK) received from a certain upstream node in the communication path has a received signal strength less than a predetermined threshold, at least one of the first node and the one or more third nodes does not regard the certain upstream node as a destination node and excludes the certain upstream node from candidates of the destination node even if receiving the ACK from the certain upstream node.

9. The wireless communication system of claim 1, wherein, in a case that each node of the one or more third nodes fails to send the measured data to a certain upstream node in the communication path and then receiving next the measured data from a downstream node in the communication path, the each node sends to the downstream node an acknowledgement (ACK) with information indicating that communication with the certain upstream node is impossible.

10. The wireless communication system of claim 1, wherein, in a case of receiving the measured data from a downstream node in the communication path, a certain node out of the second node and the one or more third nodes does not send an acknowledgement (ACK) if another node out of the second node and the one or more third nodes has already sent another ACK to the downstream node in reply to the same data.

11. The wireless communication system of claim 1, wherein, when receiving another measured data identical to the measured data previously sent, each of the one or more third nodes discards the another measured data and sends an acknowledgement (ACK) to a source node.

12. The wireless communication system of claim 11, wherein, when receiving another measured data identical to the measured data previously sent, each of the one or more third nodes does not send the ACK.

13. A wireless communication system comprising:
a first node having a wireless communication function;
a second node having a wireless communication function; and
one or more third nodes each having a function of relaying wireless communication between the first node and the second node,
wherein, while a communication path is not established to send certain data from the first node to the second node, each of the first node and the third nodes sends the certain data in broadcast,
wherein, after at least one node out of the first node and the one or more third nodes determines a destination node in the communication path, the at least one node determining the destination node sends the certain data in unicast to the determined destination node,
wherein each node of the one or more third nodes sends a source node an acknowledgement (ACK) tagged with a number of hops corresponding to a next node in reply to the certain data received by the each node,
wherein a downstream node in the communication path is configured to, when receiving a first ACK from a first upstream node in reply to the certain data sent from the downstream node, calculate a first number of hops corresponding to a case that the first upstream node is set as the destination node, based on a number of hops tagged to the first ACK,
wherein the downstream node is configured to, when receiving a second ACK sent from a second upstream node to a further node other than the downstream node in reply to the certain data sent from the downstream node after receiving the first ACK, calculate a second number of hops corresponding to a case that the second upstream node is set as the destination node, based on a number of hops tagged to the second ACK, and
wherein the downstream node is configured to, when the second number of hops is smaller than the first number of hops, set the second upstream node as the destination node.

14. The wireless communication system of claim 13,
wherein the second node sends the source node a third ACK tagged with the number of hops corresponding to the next node in reply to the certain data received by the second node, and
wherein, when receiving the ACK tagged with the number of hops from an upstream node, each node of the one or more third nodes calculates the number of hops corresponding to the next node from the number of hops tagged to the ACK, and sends the source node another ACK tagged with the number of hops corresponding to the next node in reply to next received by the each node.

15. The wireless communication system of claim 14,
wherein, when receiving the first ACK tagged with the number of hops before determining the destination node, the downstream node can set the first upstream node as the destination node, and
wherein, when receiving the second ACK tagged with the number of hops after receiving the first ACK, the downstream node compares the first number of hops with the second number of hops, and changes the destination node from the first upstream node to the second upstream node if the second number of hops is smaller than the first number of hops.

16. The wireless communication system of claim 15, wherein the downstream node stores the first upstream node as a candidate node of the destination node when changing the destination node from the first upstream node to the second upstream node.

17. The wireless communication system of claim 16,
wherein, after determining the destination node, if failing to send the certain data to the determined destination node, the downstream node resends the certain data in unicast to the determined destination node,
wherein, if failing to resend the certain data to the determined destination node, the downstream node sends the certain data in unicast to the stored candidate node, and
wherein, if failing to send the certain data to each stored candidate node, the downstream node sends the certain data in broadcast to re-establish a new communication path.

18. The wireless communication system of claim 16, further comprising
a measurement unit that measures an ambient physical quantity and creates measured data based on the measured ambient physical quantity,
wherein the certain data is the measured data.

19. The wireless communication system of claim 14, wherein, after setting the first upstream node as the destination node and then receiving the second ACK tagged with the number of hops sent from the second upstream node to a node other than the downstream node in reply to the certain data sent from the downstream node, the downstream node compares the first number of hops with the second number of hops and changes the destination node from the first upstream node to the second upstream node if the second number of hops is smaller than the first number of hops.

20. The wireless communication system of claim 19, wherein the downstream node stores the first upstream node as a candidate node of the destination node when changing the destination node from the first upstream node to the second upstream node.

21. The wireless communication system of claim 20,
wherein, after determining the destination node, if failing to send the certain data to the determined destination node, the downstream node resends the certain data in unicast to the determined destination node,
wherein, if failing to resend the certain data to the determined destination node, the downstream node sends the certain data in unicast to the stored candidate node, and
wherein, if failing to send the certain data to each stored candidate node, the downstream node sends the certain data in broadcast to re-establish a communication path.

22. The wireless communication system of claim 13, wherein each of one or more third nodes does not send the ACK in reply to the certain data sent in broadcast if another of the one or more third nodes has already sent another ACK in reply to another data identical to the certain data sent in broadcast.

23. The wireless communication system of claim 13, wherein each of the one or more third nodes does not send the ACK in reply to the certain data sent in broadcast if the second node has already sent another ACK in reply to another data which is identical to the certain data and which is sent in broadcast which is identical to.

24. The wireless communication system of claim 13, wherein, in a case that one node out of the one or more third nodes sends the ACK in reply to the certain data sent in broadcast before another node out of the one or more third nodes send the ACK, the one node out of the one or more third nodes relays the certain data sent in broadcast to an upstream node when a wait time which is longer than a reply time to send the ACK elapses.

25. The wireless communication system of claim 13, wherein, after the communication path is established, when each node of the first node and the one or more third nodes sends the certain data to an upstream node next time, the certain data is tagged with identification information assigned to the each node.

\* \* \* \* \*